US007491028B2

(12) United States Patent
Bagrosky

(10) Patent No.: US 7,491,028 B2
(45) Date of Patent: Feb. 17, 2009

(54) AUTOMATIC PAPER EJECTOR AND STACKER FOR PUNCH MACHINE

(75) Inventor: Frank L. Bagrosky, Marlboro, NY (US)

(73) Assignee: Performance Design, LLC, Boise, ID (US)

( * ) Notice: Subject to any disclaimer, the term of this patent is extended or adjusted under 35 U.S.C. 154(b) by 480 days.

(21) Appl. No.: 10/702,124

(22) Filed: Nov. 4, 2003

(65) Prior Publication Data

US 2004/0135305 A1 Jul. 15, 2004

Related U.S. Application Data

(63) Continuation-in-part of application No. 09/778,383, filed on Feb. 5, 2001, now Pat. No. 6,641,346.

(60) Provisional application No. 60/492,531, filed on Aug. 4, 2003, provisional application No. 60/180,470, filed on Feb. 3, 2000.

(51) Int. Cl.
*B65G 57/00* (2006.01)

(52) U.S. Cl. .................................... 414/790.2; 271/198

(58) Field of Classification Search ................. 271/207, 271/220, 221, 177, 178, 198; 198/400, 411, 198/414, 416, 406, 418.5, 426; 414/789.7, 414/789.9, 790.2, 791.3, 773, 783

See application file for complete search history.

(56) References Cited

U.S. PATENT DOCUMENTS

| | | | | |
|---|---|---|---|---|
| 1,582,820 | A * | 4/1926 | Hungerford | 198/396 |
| 3,908,333 | A * | 9/1975 | Cavanna | 53/51 |
| 3,924,758 | A * | 12/1975 | Gram | 414/798.6 |
| 4,253,652 | A | 3/1981 | Steinhilber | 271/8.1 |
| 4,530,430 | A * | 7/1985 | Peterlini | 198/395 |
| 5,100,125 | A * | 3/1992 | Uplinger et al. | 271/233 |
| 5,239,904 | A | 8/1993 | Yamaguchi et al. | 83/210 |

(Continued)

OTHER PUBLICATIONS

Renz Punching Machines, DTP-340A; http://www.renz.com/frames/punch/punch_dtpa.htm, printed from Renz website on Jun. 13, 2003.

(Continued)

*Primary Examiner*—Patrick H Mackey
*Assistant Examiner*—Thomas A Morrison
(74) *Attorney, Agent, or Firm*—Pedersen & Co., PLLC; Ken J. Pedersen; Barbara S. Pedersen

(57) ABSTRACT

An automatic paper ejecting and stacking machine for use with vertically-loaded desktop hole-punching equipment is disclosed. The ejector and stacker work together to remove vertically-fed paper stacks from a hole punch and align said stacks in a horizontal stacking bin adjacent the punch machine and preferably facing the operator. After the sheets are punched, a sheet transfer mechanism moves the vertically-oriented media stack in a horizontal direction from the punch machine/ejection assembly to the reception assembly. The sheet transfer mechanism may comprise a plurality of transfer paddles arranged on an drive belt wherein a motor rotates the belt to draw a paddle through the paper-receiving channel of the ejection assembly to push the media stack out of the channel. In one version, the media stack is flipped forward to rest in a forward-facing tray, while in another embodiment, the media stack is pushed rearward to rest in a rear-facing tray.

4 Claims, 22 Drawing Sheets

U.S. PATENT DOCUMENTS

| | | | | | |
|---|---|---|---|---|---|
| 5,495,932 | A | * | 3/1996 | Dyess | 198/464.1 |
| 5,527,026 | A | | 6/1996 | Padget et al. | 271/21 |
| 5,545,000 | A | * | 8/1996 | Gorsky | 414/790.3 |
| 5,628,408 | A | * | 5/1997 | Planke et al. | 209/522 |

OTHER PUBLICATIONS

Photographs of Renz DTP-340A Commercial Machine, machine commercially available prior to Aug. 2003.

* cited by examiner

AUTOMATIC PAPER EJECTOR AND STACKER FOR PUNCH MACHINE

This application claims priority of Provisional Application Ser. No. 60/492,531, filed Aug. 4, 2003, entitled “Automatic Paper Ejector and Stacker”, and claims priority of and is a continuation-in-part of patent application Ser. No. 09/778,383, filed Feb. 5, 2001, entitled “Automatic Paper Feeder for Paper Hole Punch”, issuing on Nov. 4, 2003, as Pat. No. 6,641,346, which application is a non-provisional of Provisional Application Ser. No. 60/180,470, filed Feb. 3, 2000, the disclosures of which applications are herein incorporated by this reference.

BACKGROUND OF THE INVENTION

1. Field of the Invention

This invention relates generally to the field of desktop document handling equipment. More specifically, this invention relates to an automatic paper ejector and stacking device for use with vertically-loaded desktop hole-punching equipment.

2. Related Art

The commercial printing industry, large offices and other business entities often require the use of desktop paper-handling equipment. The benefits of automating paper-handling tasks such as punching, sorting and binding are well known. Automation not only simplifies these paper-handling processes but also improves efficiency and lowers costs via reduction or elimination of operator requirements. Consequently, numerous automatic paper-handling devices have been developed.

Paper stacking machines are known in the printing industry. U.S. Pat. No. 6,443,450 (Antinora) teaches a sheet stacking apparatus wherein a rotating disk receives sheets of printed media. After the disk receives at least two sheets of printed media, a controller rotates the disk to or past a sheet stacking position and the printed materials are stacked accordingly. U.S. Pat. No. 4,275,874 (DiBlasio) discloses a stacker for handling and counting documents wherein a slotted stacker wheel assembly at the bottom of a media transfer path receives documents from the media transfer path and delivers the documents to a stacker tray substantially beneath the input tray.

Renz America Corporation (Agawam, Mass.) has produced an electric high output tabletop punch machine for professional and office use. The punching machine includes mechanisms for punching, ejecting and stacking paper of various sizes. Paper is manually fed into a vertical punching assembly by an operator. After holes are punched, an ejector mechanism clears the sheets of paper from the punching assembly by displacing the vertically-oriented sheets horizontally from the punching area to a position above the stacking area. Paper ejected from the punching area is then momentarily suspended above the stacking area in a shallow groove upon a shaft. The weight of the paper causes the punched sheets to fall into a stacking bin at the rear of the machine (opposite the operator).

Still, there is a need for an automatic paper ejecting and stacking machine for office and professional use that may be adapted for use with commercially available punching equipment to increase operational efficiency and productivity.

SUMMARY OF THE INVENTION

According to the objects of the invention, the present invention is an automatic paper ejecting and stacking machine for use in conjunction with conventional desktop paper punch assemblies. The paper ejector and stacker may be easily retrofit to existing vertically-loaded paper punch machines to clear punched paper from the punch and stack sheets of paper in a bin that is readily accessible to the operator. The automatic ejector and stacker significantly reduces normal operator requirements for punching and stacking machines thereby increasing efficiency and productivity.

The invented ejecting and stacking device is preferably adapted for use with conventional, vertically-loaded punch machines, and comprises a paper ejection system and a paper stacking system. For simplicity, the automatic ejector and stacker is best described in terms of its two component systems: the ejection assembly and the reception assembly. In the preferred embodiment, the ejector and stacker is easily adapted to a variety of vertically-loaded media punch machines by placing the ejection assembly atop the punch machine. Preferably, the ejection assembly may be removably secured to the punch in the proper orientation using adjustable clamps, screws, or other fasteners. The reception assembly is then placed adjacent to the punch/ejection assembly and removably secured to the ejection assembly and/or the punch machine.

In the preferred embodiment, the ejection assembly sits directly above the punch so that paper is fed vertically through a sheet receiving channel in the ejection assembly prior to entering the punching area. Preferably, the ejection assembly comprises a plurality of paddles arranged on an endless drive belt. After the media sheets are punched, the endless drive belt typically rotates through one half-rotation to sweep a transfer paddle horizontally through the sheet receiving channel of the ejection assembly. As it is swept horizontally, the transfer paddle grips and/or pushes the punched sheets to slide the sheets out of the channel and, consequently, away from the punch machine and into the reception assembly. The punched sheets are moved out of the punch in a direction substantially parallel to their length.

The reception assembly of the preferred embodiment comprises means for accepting bundles of punched sheets and a mechanism for neatly stacking these sheets in a bin that is readily accessible to the machine operator. Preferably, ejected paper bundles are forced into a groove atop a rotating paper-accepting shaft. An adjustable paper stop guide preferably halts the horizontal motion of the paper to generally align the media sheets along their leading edge. When the horizontal translation of the paper bundle has stopped, an actuator rotates the paper-accepting shaft toward the operator to flip the media sheets forward and down into a stacking bin. The media sheets are dumped into the stacking bin such that they sit flat and generally horizontally within the bin. After being flipped into the stacking bin, the sheets are aligned by push bars that tap the edges of the stacked paper coincidently with the rotating shaft’s return to the ready (receiving) position. Preferably, the push bars are integral with, and/or rigidly connected to, the rotating shaft and are co-actuated with this flipping mechanism. In the preferred embodiment, these bars extend from a position on the rotating shaft generally opposite the receiving groove.

When the paper punching operation is complete, bundles of punched, stacked paper may be easily retrieved by the machine operator. It may be necessary to perform minor alterations to the paper stacks; however, the sheets are preferably aligned substantially along their length and width after being processed by the automatic paper ejector and stacker.

BRIEF DESCRIPTION OF THE DRAWINGS

FIG. 16A is a right, perspective detail view of the stocking area of FIG. 16*a*, with paper stops retracted into a down-position and the picking mechanism raised up.

DETAILED DESCRIPTION OF THE INVENTION

Referring now to the figures, one, but not the only, embodiment of an automatic paper ejecting and stacking system according to the present invention is illustrated. The automatic ejector and stacker is intended for use with conventional paper punching machines, particularly those in which the paper is loaded into the punch vertically. The invented ejecting and stacking system is designed to significantly reduce workload and normal operating requirements associated with punching and stacking large volumes of sheet media such as may be necessary in the printing industry, other document handling industries or large offices and business entities.

The automatic ejecting and stacking system comprises fastener(s) for attaching to a conventional, vertically-loaded desktop punch, a mechanism for clearing paper from the punching assembly after holes have been punched and a mechanism for receiving and stacking media sheets and/or bundles in a bin that is readily accessible to the machine operator. The invented system may be best described in terms of its preferably two generally functionally separate component systems: the ejection assembly and the reception assembly.

Figure 1:
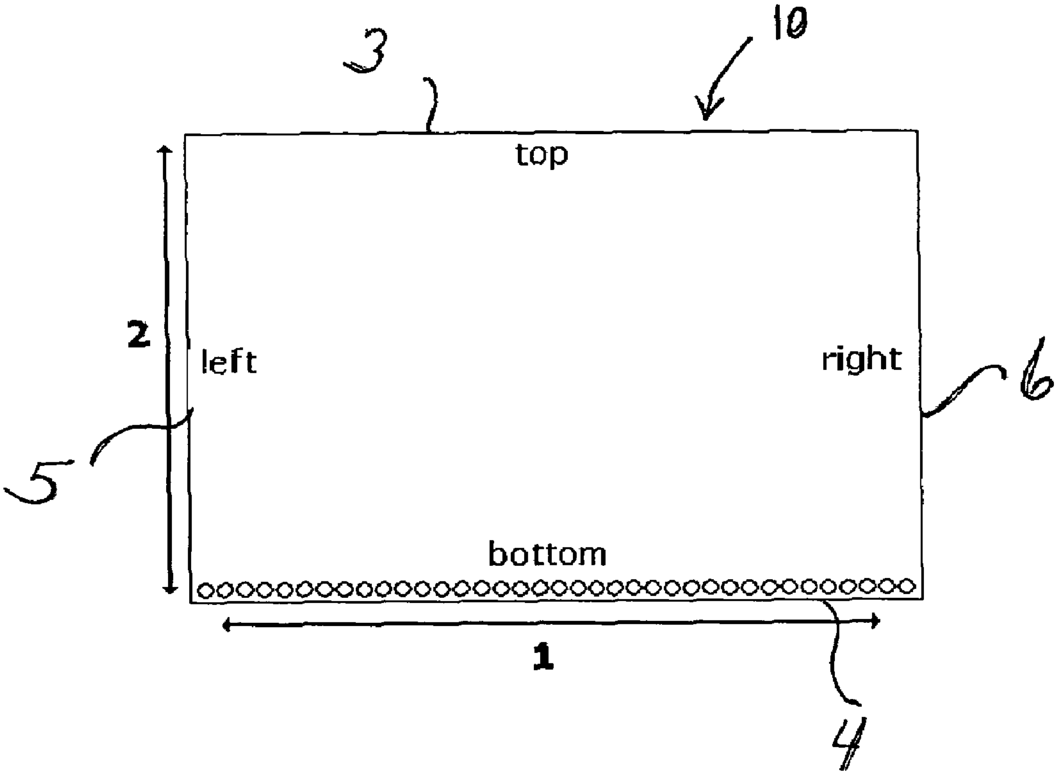
FIG. 1 is a top view of a media sheet demonstrating the orientation in which the sheet(s) are fed into the ejector and stacker of the present invention.
Figure 2:
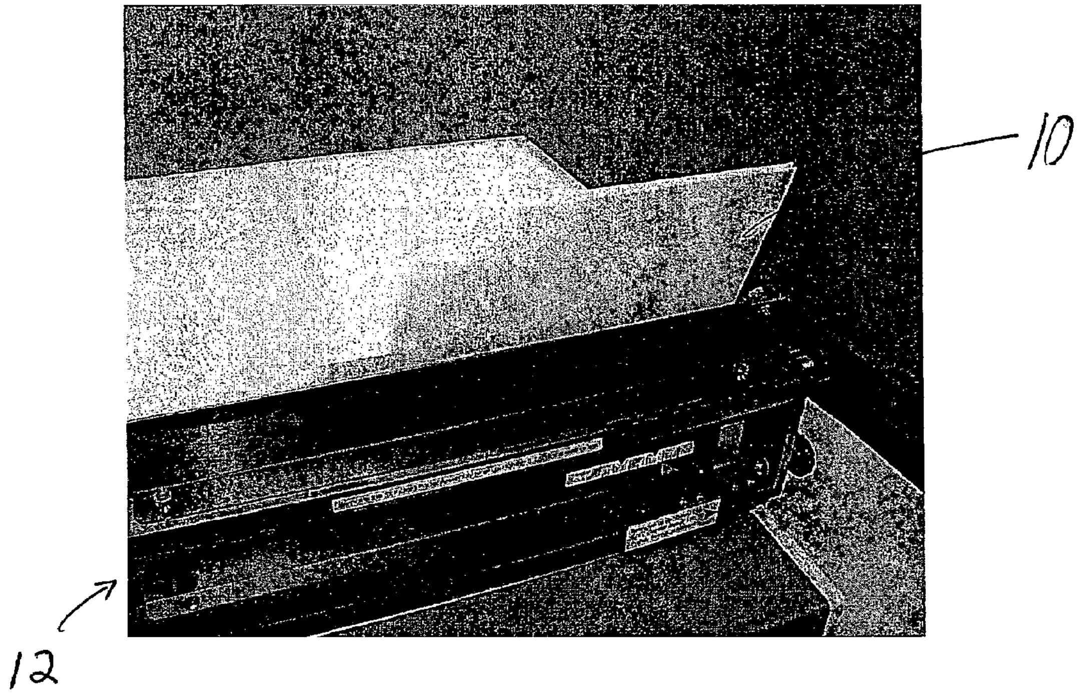
FIG. 2 top, perspective view of several media sheets inserted into an embodiment of a paper ejector and stacker according to the present invention.

For purposes of clarity, the following description has been written with respect to the media sheet 10 orientation suggested in FIG. 1. As shown in FIG. 1, each sheet of media has a top 3, bottom 4, left 5 and right 6 edge. FIG. 2 demonstrates the preferred orientation of the media sheets 10 (shown in FIG. 1) as the sheets are inserted into the punching assembly 12. Throughout this description, the bottom edge 4 will be considered the "punched" edge or the edge to be punched. Preferably, the top 3 and bottom 4 edges define a first edge length 1, which is also, typically, the horizontal dimension of the media sheet(s) when fed into the punch machine, as shown in FIG. 1. The left 5 and right 6 edges of the media sheet define a second edge width 2, which is preferably also the vertical dimension of the sheet(s) loaded into the punch. Preferably, the media sheets remain unaltered along the left 5 and right 6 edges apart from the corners wherein these edges meet the bottom edge 4.

Figure 3:
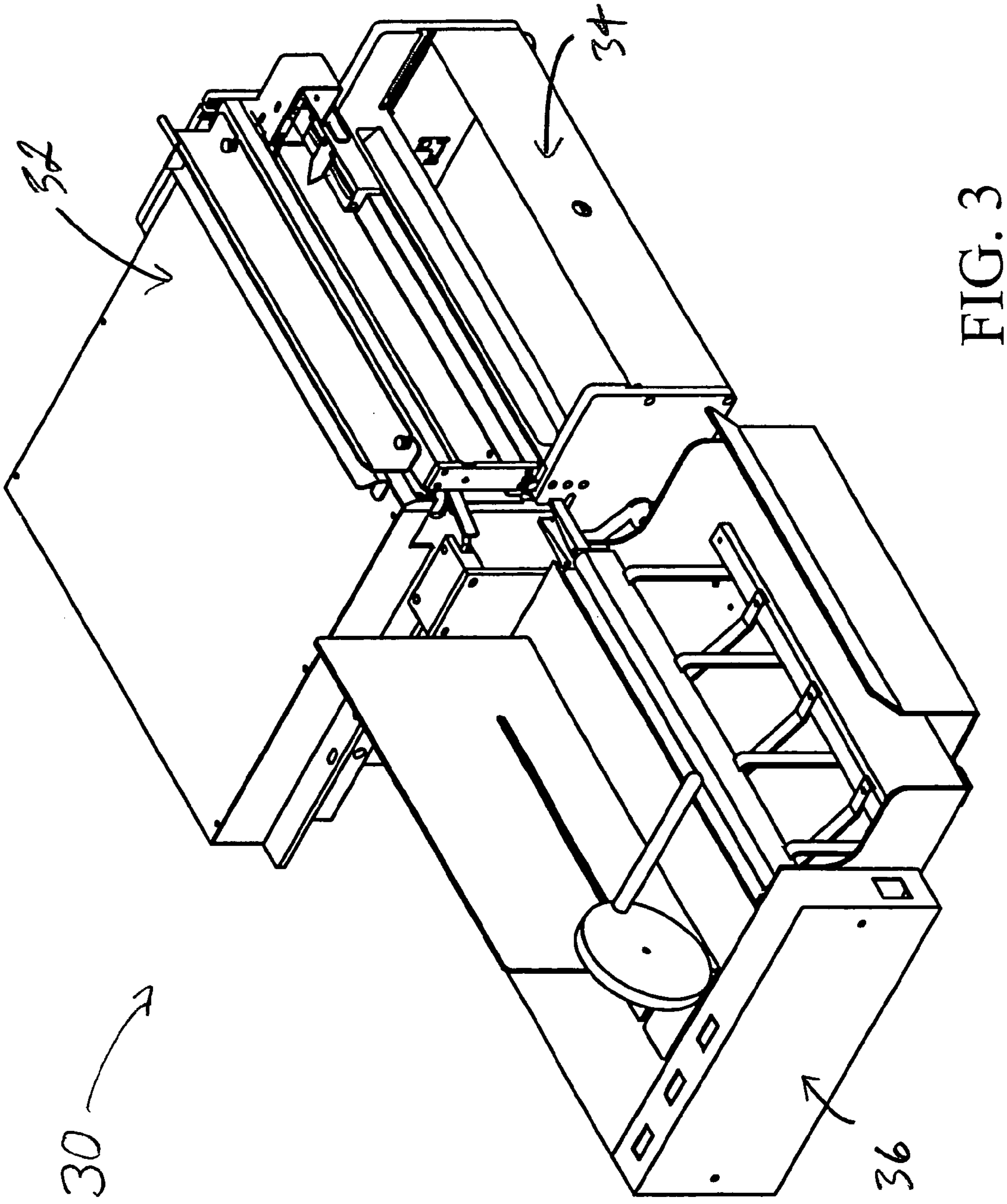
FIG. 3 is an elevation, perspective view of the preferred paper ejector and stacker according to one embodiment of the present invention.

The automatic ejecting and stacking system 30 is shown in position for operation in FIG. 3. In the preferred embodiment, illustrated in FIG. 3, the ejection assembly 32 is seated generally atop a conventional, vertically-loaded punching machine 34 and the reception assembly 36 is positioned adjacent to, and in cooperation with, the ejection assembly/punch machine combination.

Figure 4:
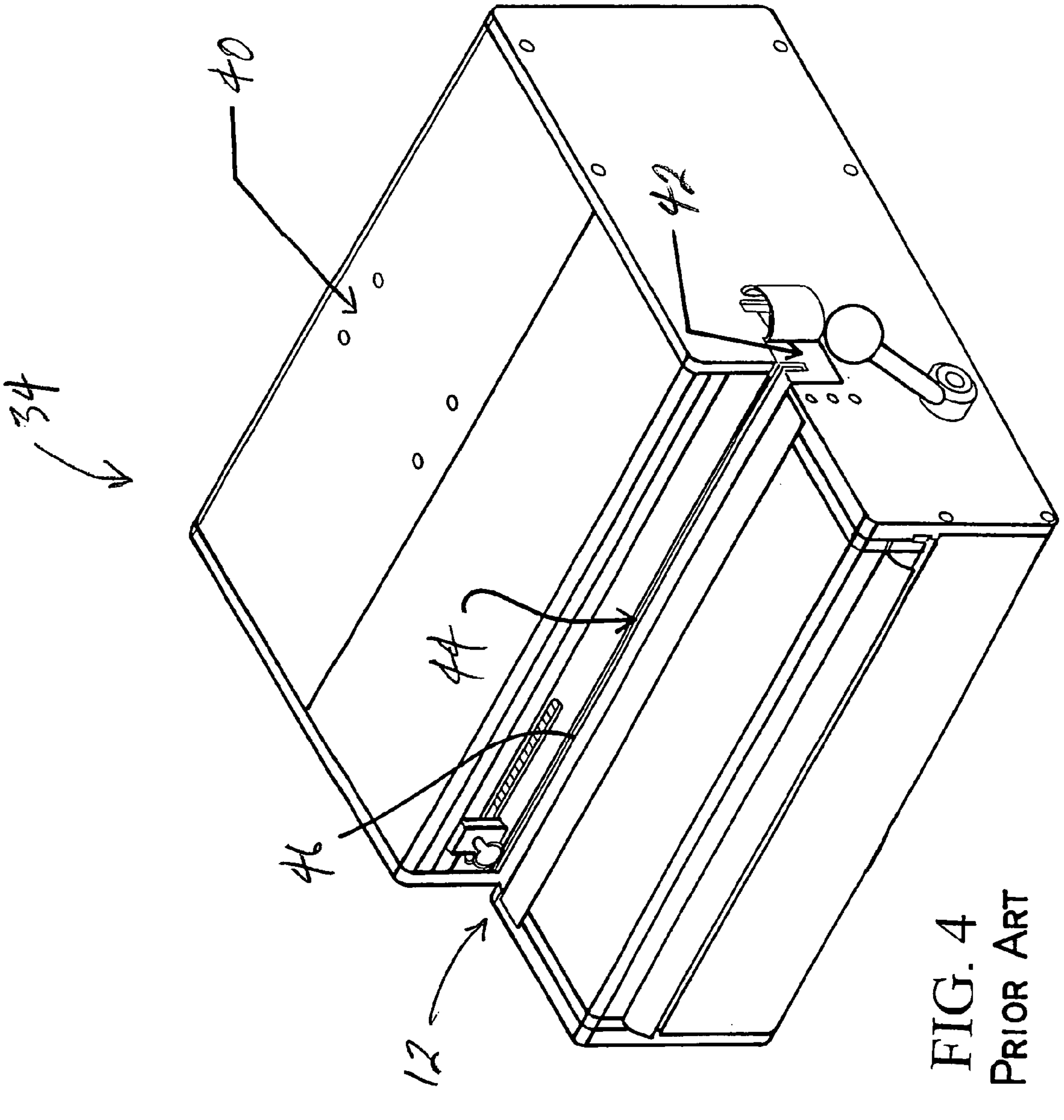
FIG. 4 PRIOR ART
FIG. 4 is an elevation, perspective view of a preferred prior art desktop punch device for use with the ejector and stacker of FIG. 3.
Figure 5:
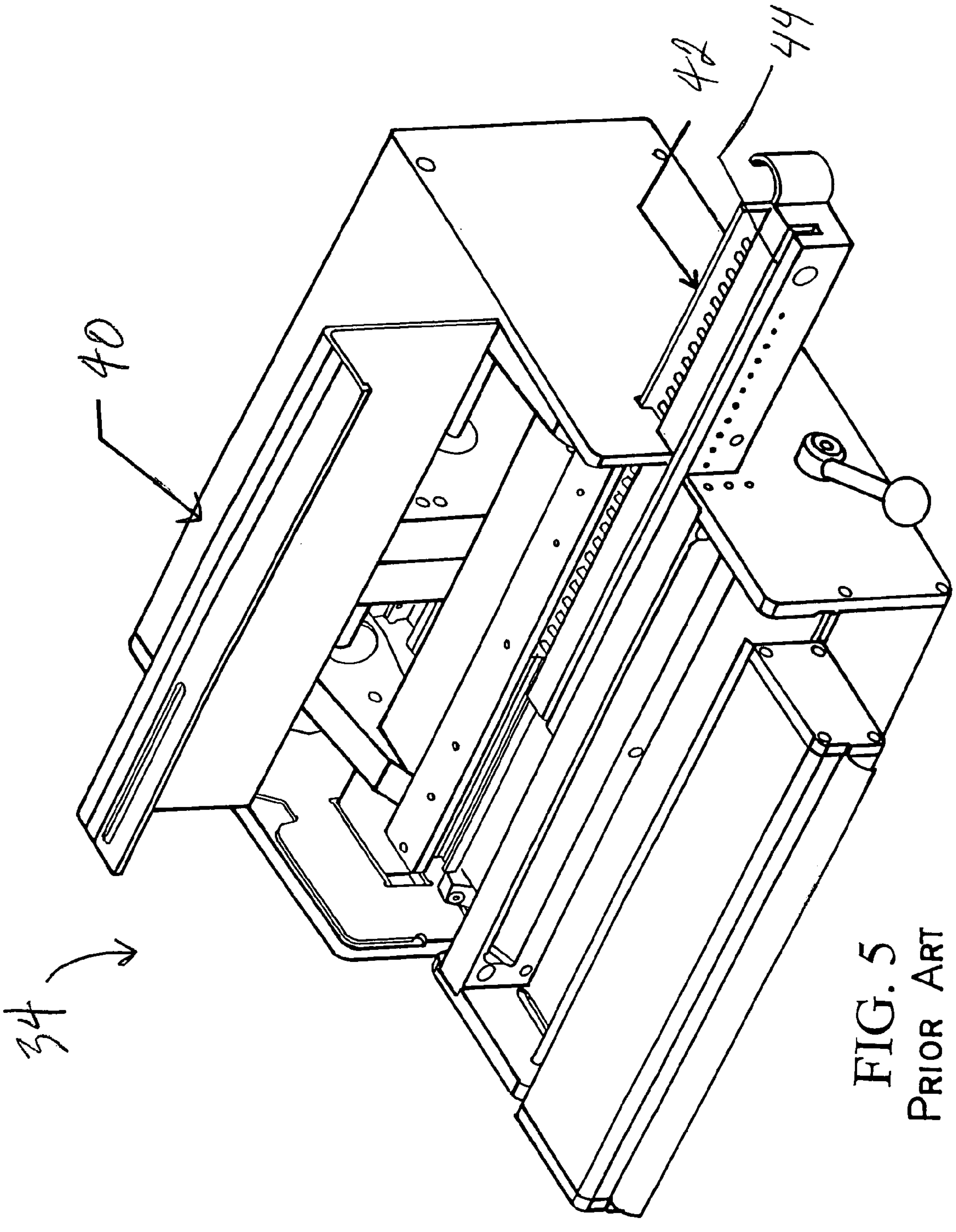
FIG. 5 PRIOR ART
FIG. 5 is an elevation, perspective view of the prior art punch of FIG. 4 illustrating removal of the die assembly from the punch.

Several companies manufacture vertically-loaded desktop punch machines. FIGS. 4 and 5 illustrate, generally, one type of punch for which the automatic ejector and stacker 30 is well-adapted. As shown in FIG. 4, the preferred desktop punch comprises a generally flat housing 40 in which is mounted a punching system 12 comprising a die assembly 42, a slot 44 for receiving paper into the die assembly and an opening 46 in the housing which permits the feeding of paper into the slot and die. The die assembly 42 of the punching system 12 may be of the type that is easily and quick-removable by unclamping and sliding the assembly out, as illustrated in FIGS. 4 and 5. A more complete explanation of the preferred die assembly function in vertically-loaded desktop punch machines is offered in U.S. Pat. No. 6,047,623 (Whiteman et al.). An especially preferred, commercially-available desktop punch, for use with the preferred embodiment of an automatic ejecting and stacking system, is the HD-7000 produced by Performance Design, Inc. of Boise, Id. Other embodiments of the invented automatic ejecting and stacking system may be adapted to operatively connect to and cooperate with other punch machines, for example, ones without quick-change die assemblies.

Figure 6:
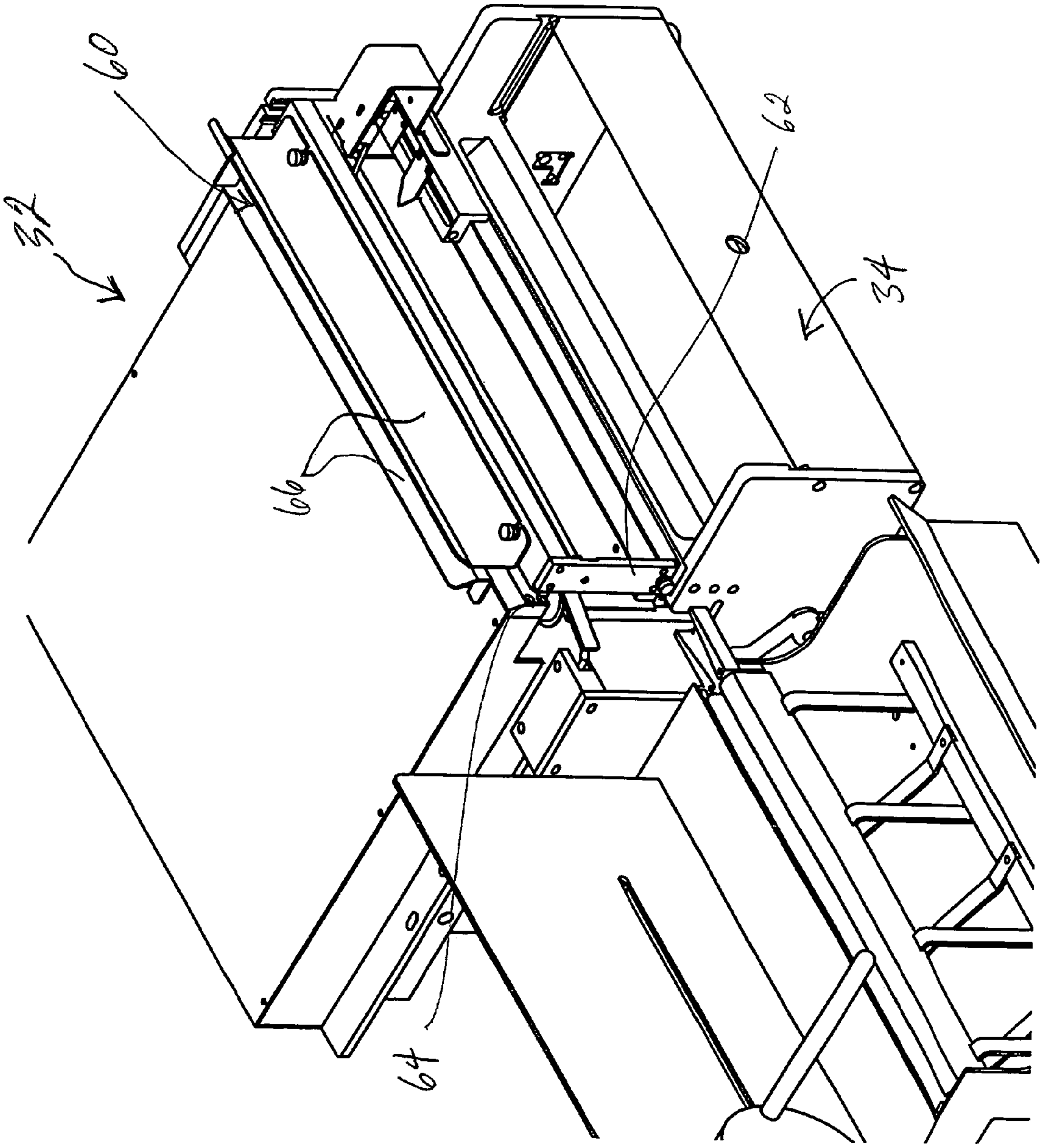
FIG. 6 is a detailed, perspective view of the ejection assembly of the ejector and stacker of FIG. 3.

The ejection assembly 32 of the preferred embodiment comprises a hood/top unit placed on top of a conventional punch machine 34 as shown in FIG. 6. Preferably, the assembly 32 may be removably secured to the punch machine 34 to prevent inadvertent or accidental disengagement of the ejection system from the punch. In addition, securement of these otherwise separate components may help ensure proper alignment of the pieces throughout installation and operation. Securement may be achieved by bolts, clamps, screws or other items and fasteners that may be easily installed and removed.

While the preferred embodiment comprises an automatic ejecting and stacking system 30 that is separate from, but is fastenable to and is removable from, the punch machine, the invention may comprise automatic ejecting and stacking systems that are manufactured to be integral with the cooperating punch machine. Still, parts or all of the integral system may be removable by unbolting or other unfastening, for providing access to the die assembly or other parts of the punch machine for maintenance, repair or punch pin replacement.

Figure 7:
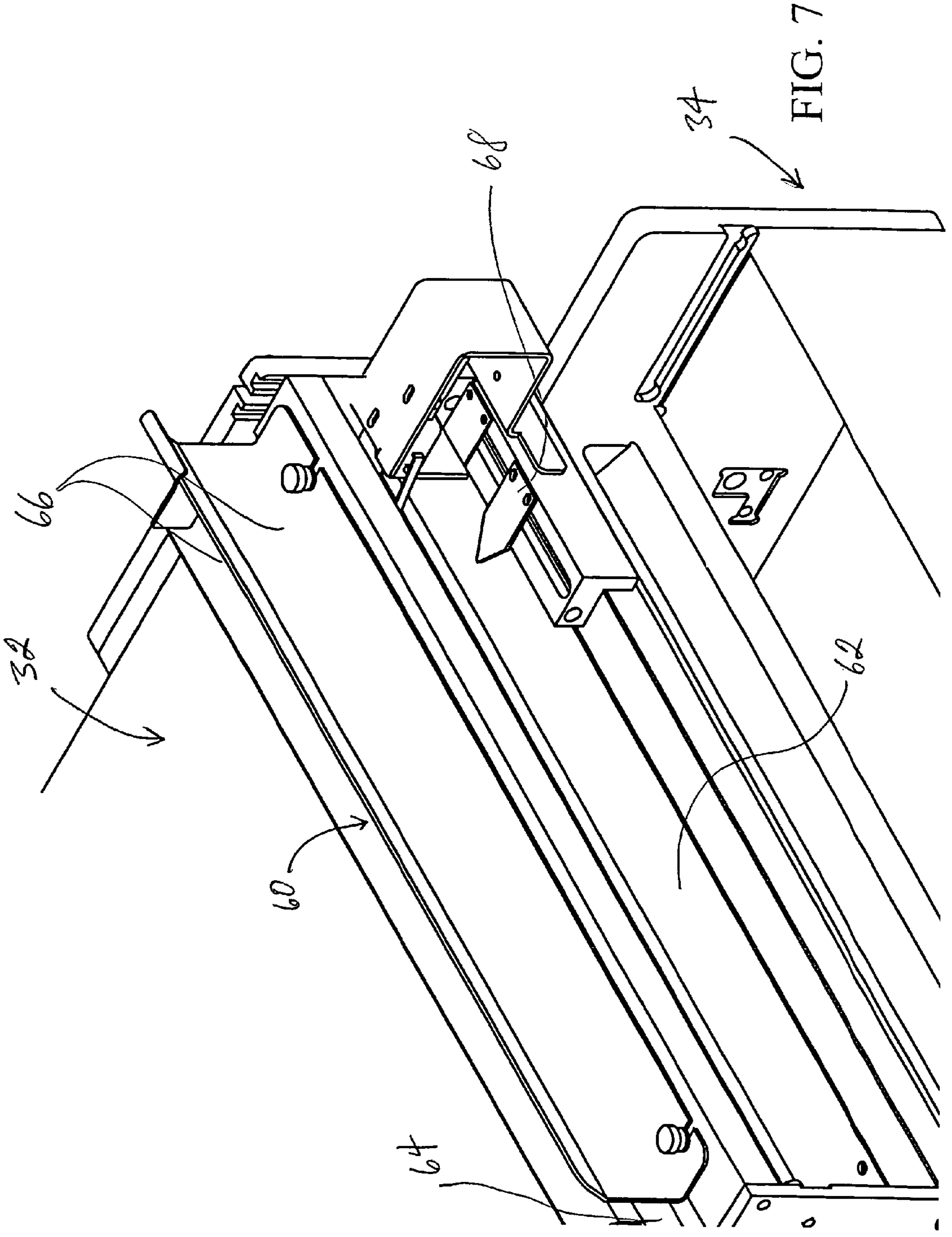
FIG. 7 is a further detailed view of the assembly of FIG. 6 showing the paper alignment mechanisms of the ejection assembly.

An important feature of the preferred ejection assembly 32 is the sheet receiving channel 60. The sheet receiving channel allows media stacks and/or individual media sheets to be fed into the hole punching area through the ejection assembly 32. The channel comprises generally a gap between a front 62 and rear 64 panel, as shown in FIGS. 6 and 7. Preferably, the receiving channel 60 is positioned directly above the slot 44 in the die assembly of the punch system. In the preferred embodiment, the sheet receiving channel braces media sheets in an upright (vertical) position as they are loaded, punched and ejected. Also, the channel 60 provides access to the hole punching die assembly 42. The height of the receiving channel may be adjusted via the addition of brackets 66, such as those shown in FIGS. 6 and 7, and the width of the channel is preferably selectable using a sliding paper alignment device 68. For sheets with small edge widths 2, the brackets 66 are preferably removed to facilitate handling of the documents by the operator. Preferably, the position of the alignment device 68 may be preset to correspond with the edge length 1 of the media sheets being fed into the punch 34. For example, the alignment device 68 may be set to 11" to receive a stack of 8½"×11" sheets. Preferably, the paper alignment device helps ensure accurate punching of sheets fed into the system 30.

Figure 8A:
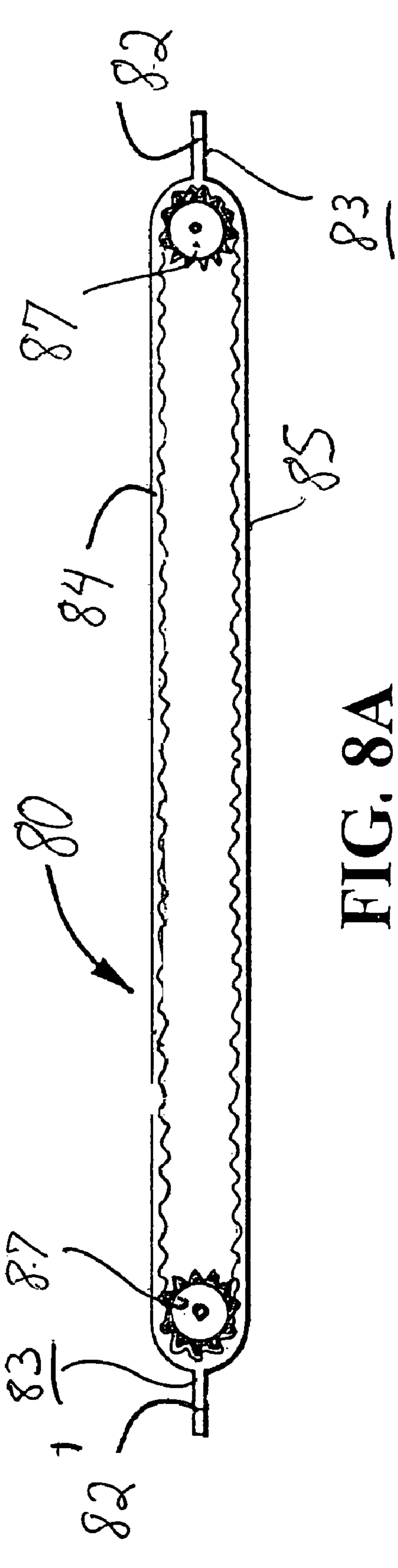
FIG. 8 is a schematic of the preferred endless belt drive and paddle system for use in the ejection assembly of FIG. 6.
Figure 8B:
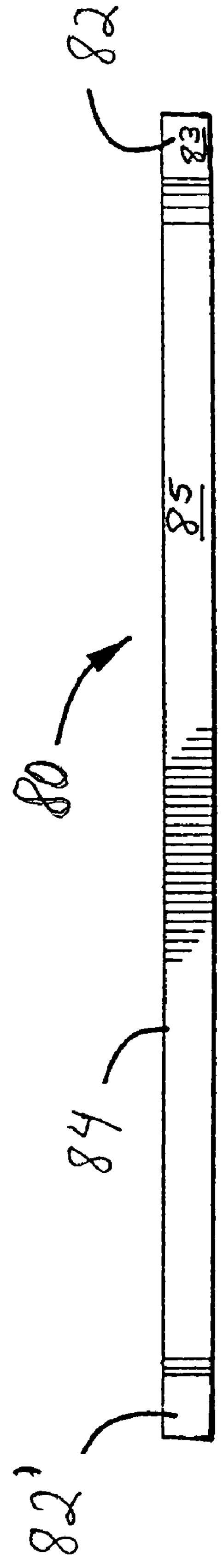

Another important component of the ejection assembly 32 is the sheet transfer mechanism 80. In the preferred embodiment, the sheet transfer mechanism is located substantially within or behind the rear panel 64 of the ejection assembly. The sheet transfer mechanism of the preferred embodiment comprises a plurality of transfer paddles 82 and 82' or hooks mounted to an endless drive belt 84, as shown in FIGS. 8A and 8B. In an especially preferred embodiment, the number of transfer paddles 82 and 82' or hooks is two. This way, one half-rotation (180°) of the endless drive belt 84 sweeps a paddle through the full length of the sheet receiving channel 60. The preferred orientation of the transfer system within the ejection assembly is shown in FIG. 8B, with the outer side 85 of the belt being parallel with the plane of the paper. Preferably, an electric motor, controlled by an actuator, drives the rotation of the belt. The belt and/or drive wheels or sprockets may or may not be textured so long as the belt may be rotated smoothly and without slipping. By way of example, FIG. 8A has been drawn to illustrate a toothed sprocket 87 engaging a textured drive belt 84. However, this illustration is not meant to necessarily limit the scope of the invention, as other alternatives for the drive belt, wheel/sprocket 87 and/or motor combination may be foreseeable to one skilled in the art.

After the sheets 10 have been punched, the actuator initiates rotation of the drive belt 84 via the motor. As the belt rotates, a first transfer paddle 82 preferably contacts the right edges (see FIG. 1) of the media sheets 10, opposite the paper reception assembly 36. In operation, the flat surface 83 of the transfer paddle abuts perpendicularly against the right "trailing" edge of the media stack. The first transfer paddle 82 is then drawn through the paper receiving channel 60 in the direction of the paper reception assembly 36. As the transfer paddle is drawn though the paper receiving channel, the paddle contacts and pushed a vertical edge (right edge 6 in the Figures) of the punched media sheets, and forces the media sheets out of the channel horizontally and into the paper reception assembly. In the preferred embodiment, a second transfer paddle 82' is simultaneously drawn around behind the paper receiving channel and into the ready position wherein this second transfer paddle 82' becomes the first transfer paddle 82 for the next rotation/ejection cycle. A single ejection cycle preferably comprises one half-rotation, or an approximately 180° rotation, of the drive belt 84, as illustrated schematically in FIG. 8A. However, the degree of belt rotation per cycle may be reduced for smaller media sheets. For example, for media sheets of less than or equal to 5½" (as measured along the first edge), a 90° rotation of the drive belt may be sufficient to eject the media sheets. Preferably, media sheets are forcefully ejected from the punch machine to facilitate a brief period of "un-powered" horizontal transfer between the ejection 32 and reception 36 assemblies after disengagement from the first transfer paddle 82. In other words, the paddle preferably imparts sufficient velocity to the media stack to enable the stack to slide longitudinally beyond the point and time wherein the paddle has disengaged from the stack and has ceased to apply a driving force.

Figure 9:
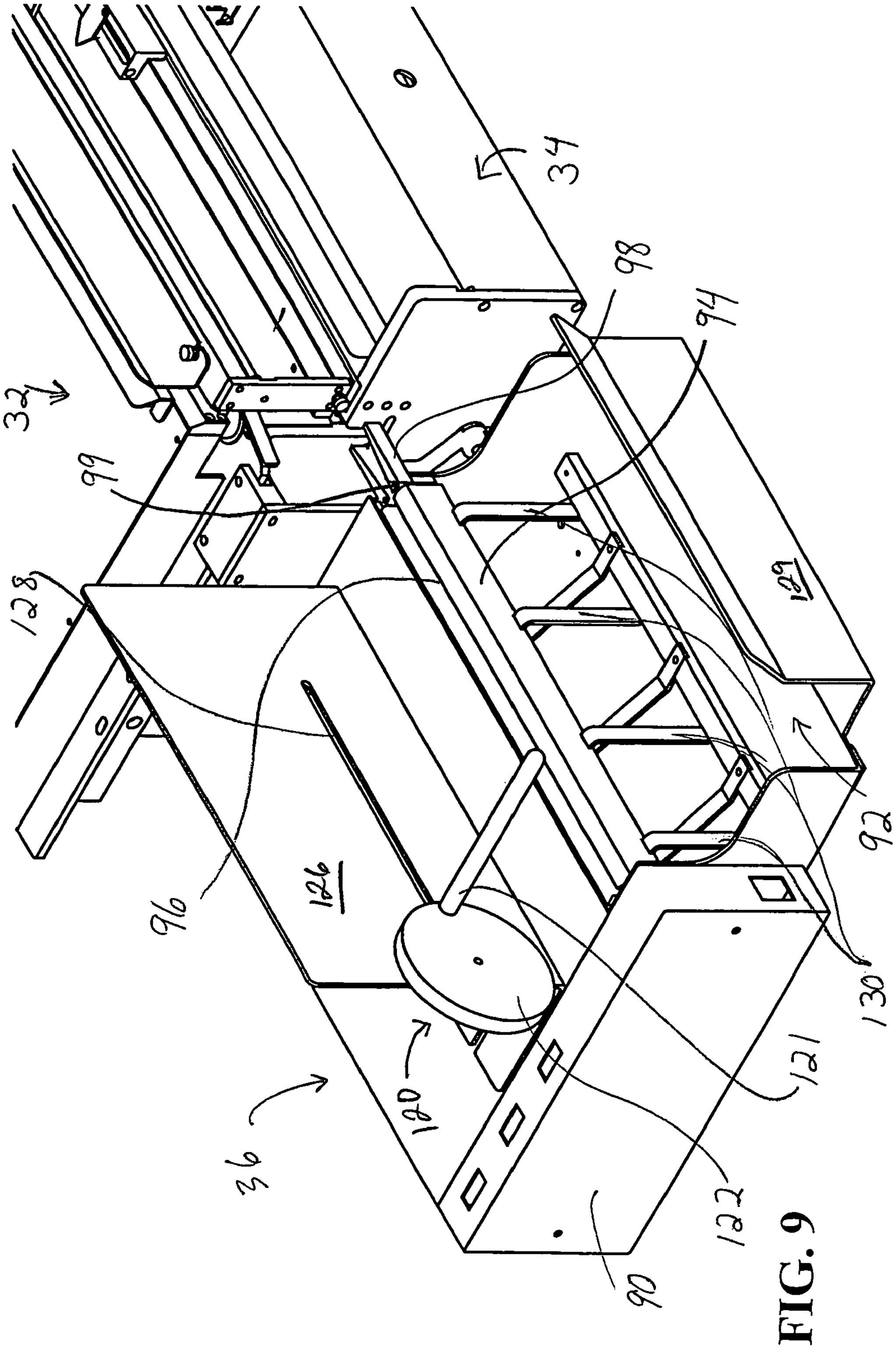
FIG. 9 is a detailed, perspective view of the reception assembly of the ejector and stacker of FIG. 3.

The paper reception assembly 36 of the preferred embodiment is positioned at one side of the punch machine near a die assembly end. The preferred paper reception assembly 36 comprises an exterior housing; a system for accepting media sheets or stacks of media sheets, from the ejection assembly; a system for aligning the sheets along the top edge 3 and the punched, bottom 4; a system for aligning the sheets along the left 5 and right 6, unaltered/unpunched edges (see FIG. 1); and a system for stacking the aligned sheets in a bin that is readily accessible to the machine operator, as shown in FIG. 9. The functioning components of the reception assembly are contained within the housing 90 which includes a stacking bin 92. Preferably, smooth "seamless" interaction between the ejection 32 and reception 36 assemblies of the invented ejector and stacker 30 permit punched media sheets to be ejected (from the punch), aligned and stacked automatically with little, if any, intervention required by the operator. To ensure seamless interaction of the ejection and reception assemblies in the preferred embodiment of the automatic desktop ejecting and stacking system, the separate assemblies must be attached properly. An example of attachment of the preferred ejection 32 and reception 36 assemblies to the punch machine is described in the Operator's Training Manual forming part of Provisional Application Ser. No. 60/492,531, filed Aug. 4, 2003, which is incorporated herein.

Figure 10:
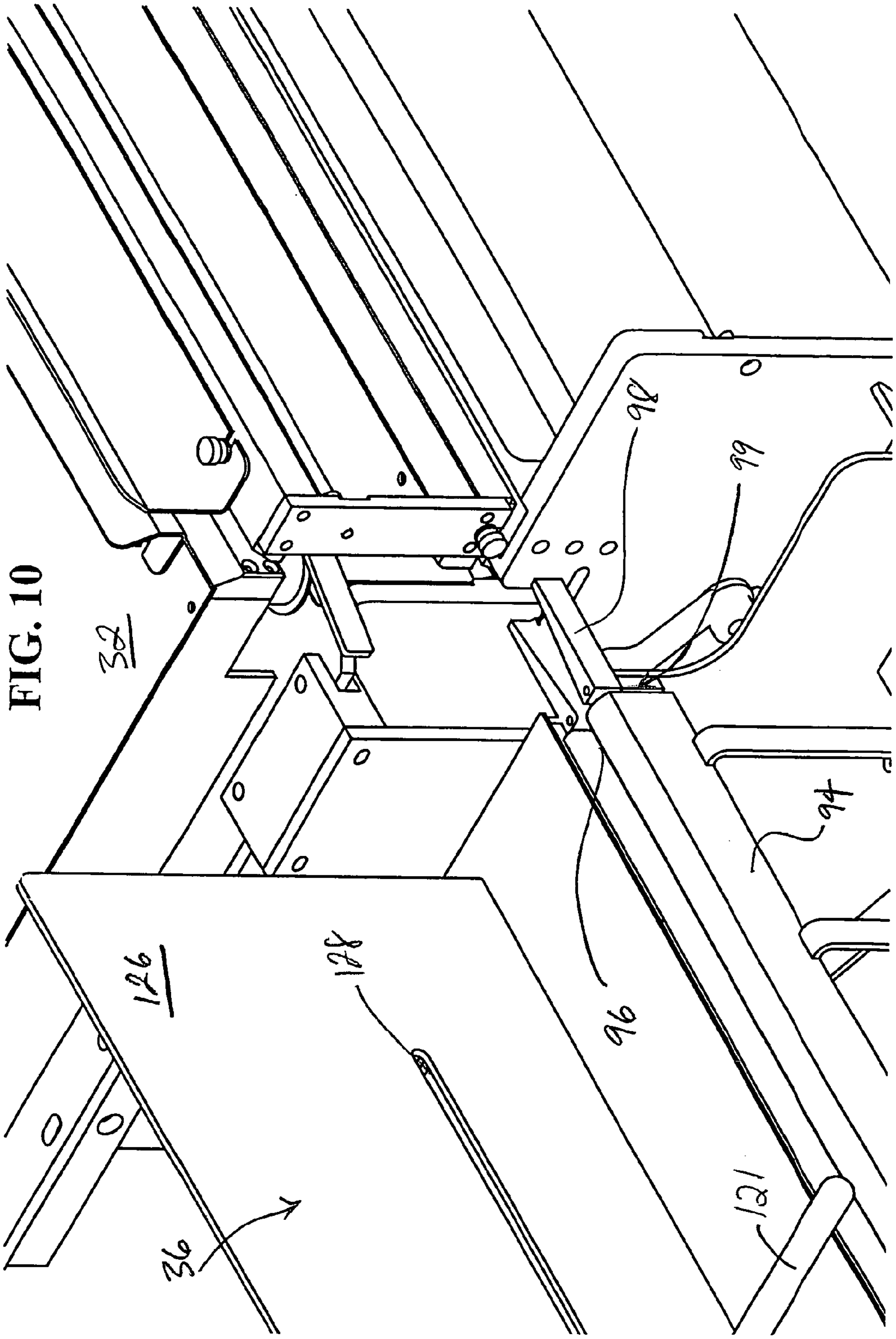
FIG. 10 is a detailed, perspective view of the paper-receiving means of the reception assembly of FIG. 9.
Figure 11:
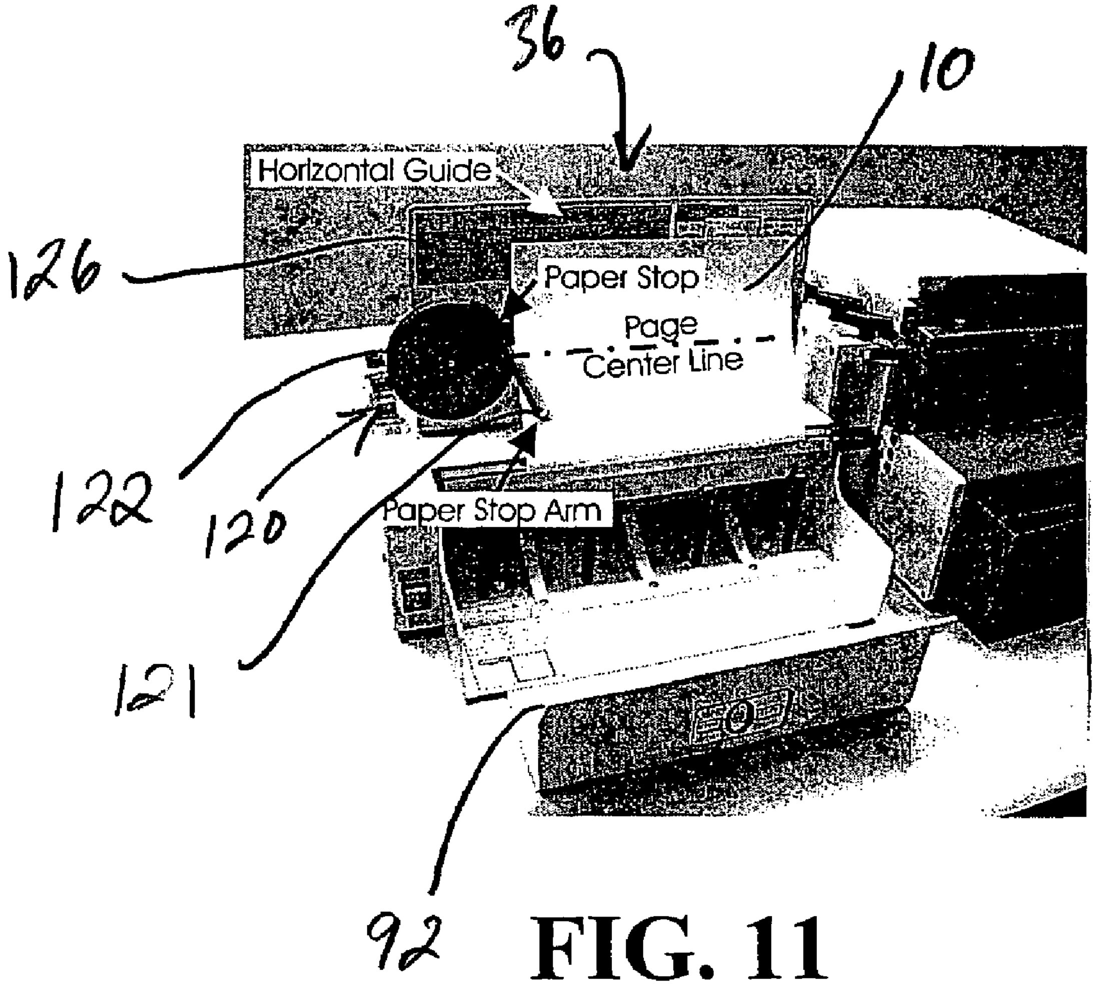
FIG. 11 is a front, perspective view of the reception assembly of FIG. 9 showing media sheets in position for stacking.

In the preferred embodiment, the paper accepting means of the reception assembly 36 comprises a rotating shaft 94 with a generally shallow groove 96, as shown in FIGS. 9 and 10. Media sheets are preferably fed into the punch machine by being lowered vertically or generally vertically into the punch machine, with the bottom edge 4 being inserted into the die assembly for punching. While FIG. 1 illustrates a typical sheet orientation, the media sheets may be inserted in other orientations, for example, with the narrow dimension downwards and being punched. Once the preferred orientation is determined for insertion and punching, the media sheets(s) stay in that orientation and stay generally vertical during ejection from the punch machine. Therefore, ejection is done with the media sheets still vertical but moving in a direction generally 90 degrees (sideways) from the direction (downward) in which they were inserted into the punch machine. The media sheets are similarly received within the shallow groove 96 of the reception assembly, as shown in FIG. 11. Preferably, forcefully ejected media sheets are directed into the paper-accepting groove 96 via a funnel guide 98, as is also shown in FIGS. 9 and 10. The funnel guide preferably lies in the same plane as the accepting groove 96 and has approximately equal depth as the groove so that sliding media sheets glide easily over the seam 99 between the two components. The opening of the funnel guide 98 is preferably wider at its first end (distal to the paper reception assembly) than at its second end (adjacent the accepting groove). Narrowing of the opening in the direction of the reception assembly helps direct large, or separated, stacks into the generally narrow accepting groove 96.

Figure 12:
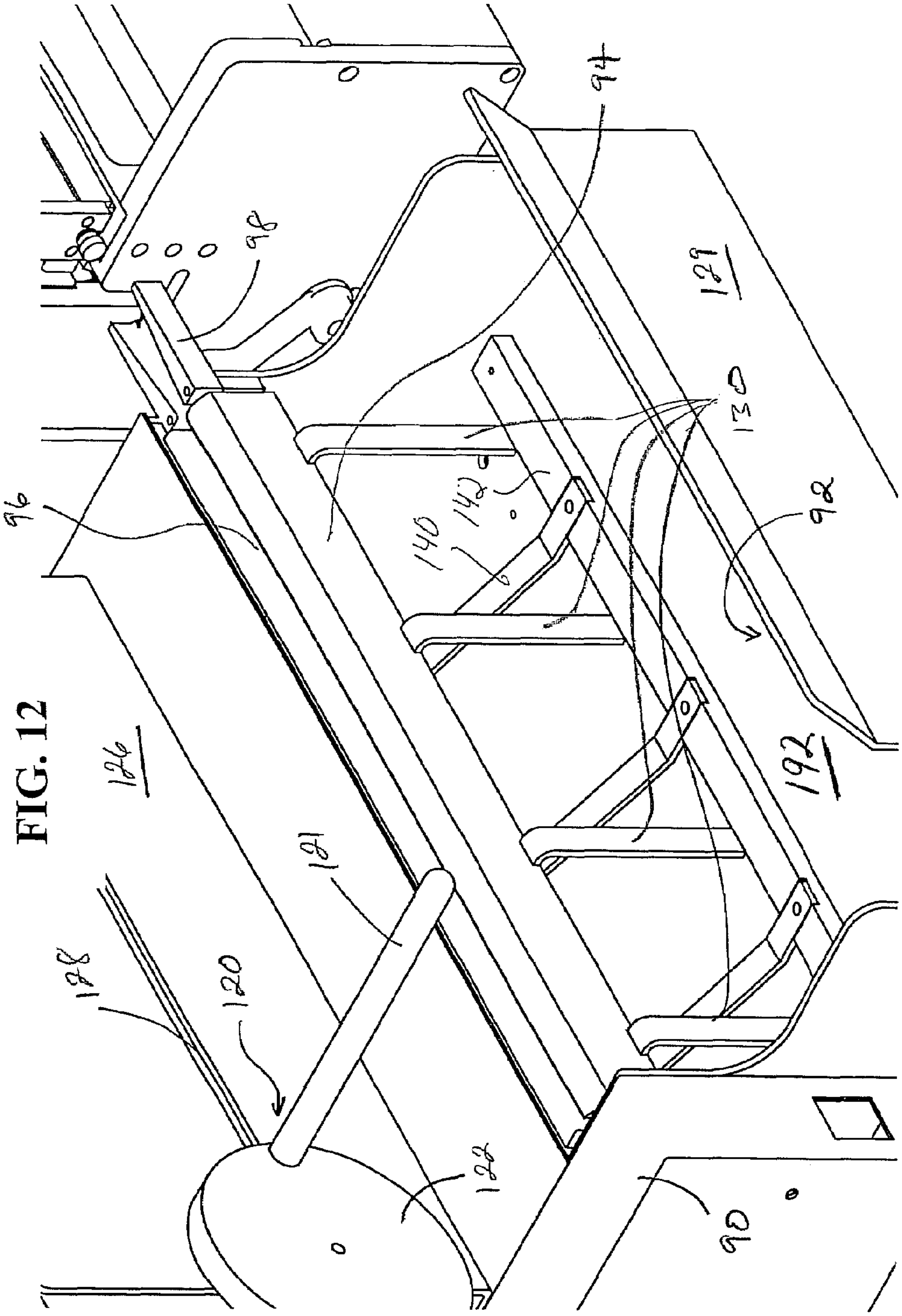
FIG. 12 is a detailed, perspective view of the paper stacking means of the reception assembly of FIG. 9.
Figure 13:
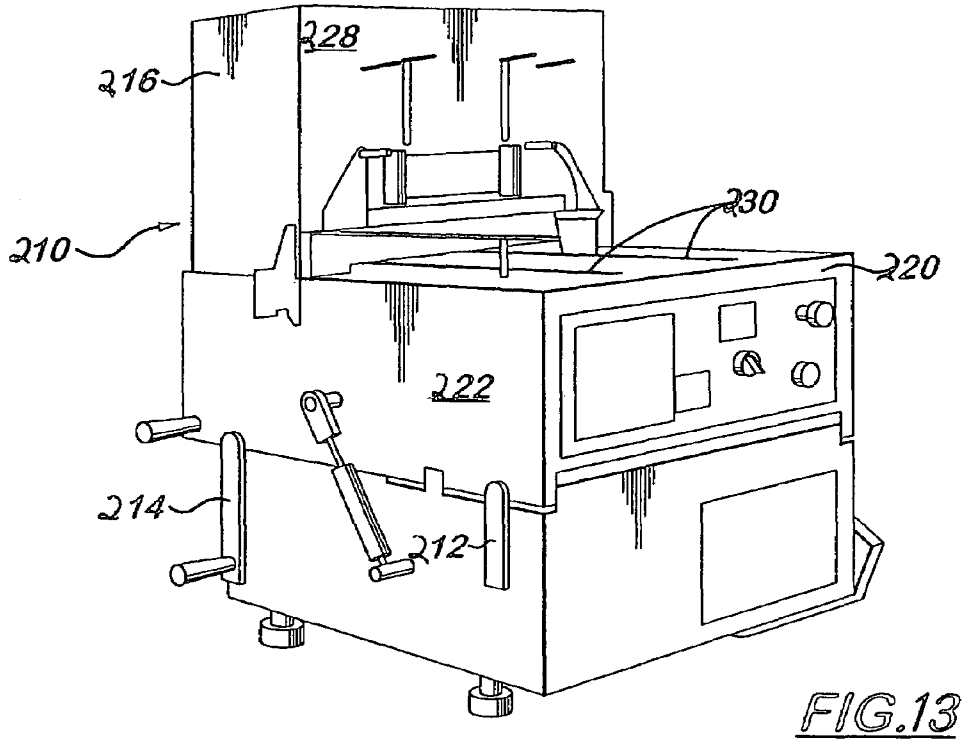
FIG. 13 is a right-rear perspective view of an alternative embodiment, including an automatic paper feeder installed on top of one embodiment of a hole punch.
Figure 14:
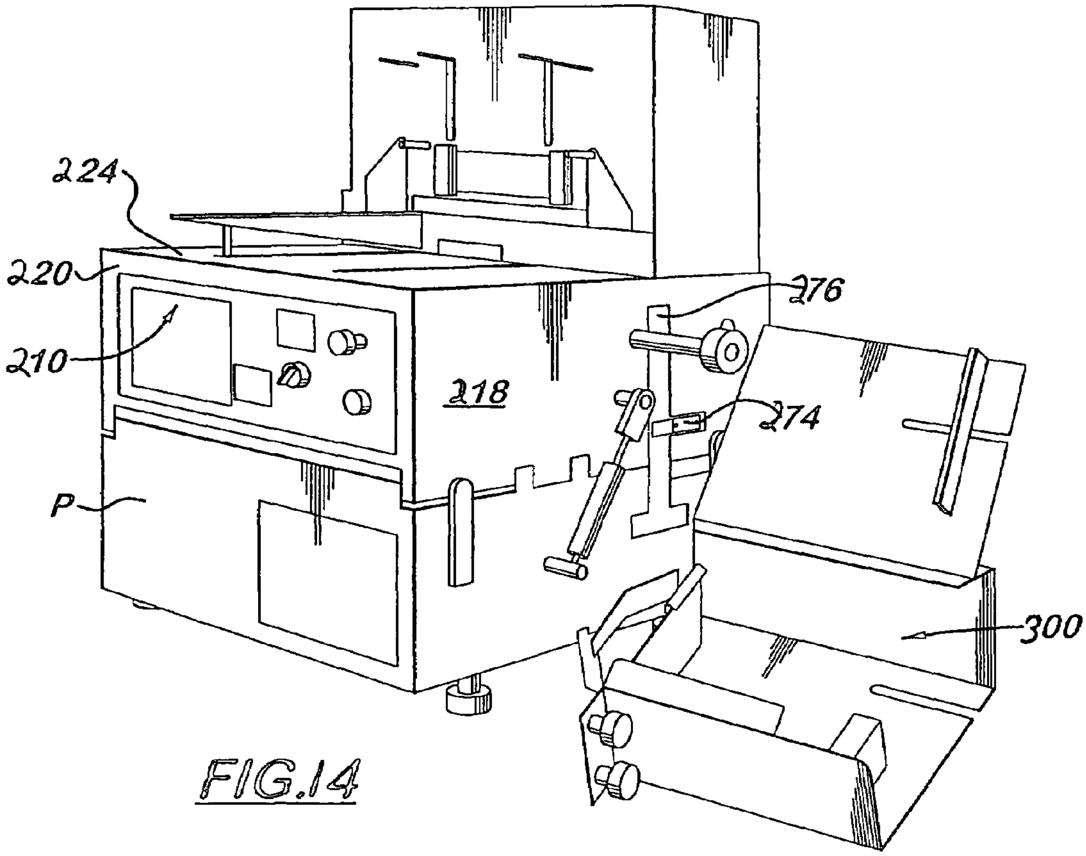
FIG. 14 is a left-rear perspective view of the embodiment of FIG. 13, revealing an alternative embodiment of a paper reception tray installed near the paper outlet of the hole punch and paper feeder, wherein the alternative embodiment of the paper reception tray faces rearward.

After being directed into the paper-accepting groove 96, the media sheets preferably continue to slide horizontally within the groove until such motion is halted by a paper stop guide 120. The paper stop guide of the preferred embodiment comprises a fixed arm 121 extending outwardly from a rotatable disk 122 wherein the disk is moveably mounted to a rear panel 126 of the paper reception assembly housing 90. Preferably, the arm 121 is substantially perpendicular to the visible, circular surface of the disk 122, and perpendicular to the plane of the paper. In addition, the arm is preferably positioned at or near the outer circumference of the disk. To adjust the paper stop guide 120 to the approximate size of the media sheets being punched, the disk 122 may be rotated until the arm 121 is positioned a particular distance, approximately equal to the first edge length 1 (see FIG. 1), away from the seam 99 between the paper-accepting groove 96 and the funnel guide 98. Large horizontal adjustments of the paper stop guide may be made by sliding the entire disk assembly 120 along the elongated track 128 cut into the rear panel 126 of the reception assembly, as shown in FIGS. 9 and 12. Indicia for frequently-used paper stop positions (corresponding to specified first edge lengths 1) may be marked on the disk 122 or on the rear panel 126 of the paper reception assembly 36 to simplify paper stop 120 adjustments.

As the paper slides toward and hits the arm 121, a hard, unpadded arm 121 may cause a small dent in the paper. Therefore, a foam or other cushioning sleeve or collar (not shown) may be fit onto the arm 121 for cushioning the impact of the paper against the arm 121. Alternatively, the arm 121 may be made of an inherently slightly cushioning material, such as a rubber or plastic that is not as hard as metal. This may be necessary or desirable for some customers, due to the velocity of the paper being pushed out of the ejection system.

As soon as the media sheets reach the paper stop guide 120, an actuator initiates rotation of the paper-accepting shaft 94. This may be done by the motion of the paper tripping/impacting a switch that activates shaft rotation, or it may be done according to the timing required to eject the paper, as may be understood by one of skill in the art after reading this description and viewing the drawings. Preferably, the shaft rotates in the direction of the operator (who stands in front of the punch machine 34) toward a stacking bin 92 that is, consequently, readily accessible to the operator. Rotation of the shaft 94 spins the accepting groove toward the operator preferably about 90-135°. Such rotation flips the paper forward and allows gravity to pull the top edges of media sheets down and into the stacking bin 92. As the top edges 3 fall into the bin, the bottom edges 4 slide smoothly out of the accepting groove 96. This rotation step may therefore be described as motor-driven rotation or pivot of the shaft 94, from the paper-receivina position wherein the groove 96 is upward, to a paper-dropping position wherein the groove has rotated 90-135° forward toward the bin 92.

To assist the stacking process, a slide mechanism is preferably provided at the rear of the bin. The slide mechanism comprises a plurality of sloped guides 140 and a lift bar 142, as shown in FIG. 12. The sloped guides 140 preferably comprise wires, plates or rods extending out and down from the rear of the reception assembly 36. These guides preferably direct the media sheets toward the outer wall 129 of the housing 90 when the sheets are dumped into the stacking bin. The guides 140 and lift bar 142 keep the punched edges of the paper, now pointed toward the rear of the reception assembly 36, lifted up slightly relative to the bottom surface 192 of the stacking bin, which is the upwarddly-facing bin floor surface. This way, the front surfaces of the push bars 130 (described below) properly hit the punched edges, rather than the bars 130 sliding above and over some or all of the sheets. The lift bar 142 comprises essentially a thin plate or bar situated generally beneath and at the forward end of the sloped guides, as shown in FIG. 12. Preferably, the lift bar raises the bottom (punched) edge 4 of the media stack to prevent the sheets from sliding backwards in a direction opposite the outer wall/front wall 129. As a result, the top edges 3 (see FIG. 1) of the media sheets abut the outer wall 129 of the housing and align generally along their length 1. The lift bar also provides a small space beneath the stacked paper, for easier access and removal by the operator.

To ensure proper alignment of the media sheets, push bars 130 protruding from the underside (opposite the paper-accepting groove 96) of the rotating shaft 94 preferably align the bottom, punched edges 4 (see FIG. 1) in the last stage of the stacking cycle. A detailed view of the push bars 130 is provided in FIG. 12. As the rotating shaft 94 returns to its neutral (paper-receiving) position the then vertically-oriented push bars contact/abut against the bottom (punched) edges 4 of the media sheets to press the top edges 3 against the outer wall 129 of the housing 90 and further align the top and bottom edges of the media sheets. In other words, the rotating shaft 94 in its neutral position (with groove 96 upward) receives ejected media sheet(s), rotates to place the groove 96 facing generally forward for flipping/dropping the media sheets, and rotates again into the neutral position and, in doing so, taps the just-dropped media sheets with its push bars 130 to urge them into an aligned and proper position in the tray. In order for the push bars 130 to tap the punched edges of the just-dropped media sheets, the step of the shaft 94 returning to its neutral position comprises the groove 96 rotating upward relative to the bin 92 and the push bars 130 moving generally forward so that their front surfaces tap the punches edges of the just-dropped sheets. This process is continually repeated for as long as the ejection and punching cycles are ongoing.

Alignment along the left 5 and right 6 edges (see FIG. 1) is generally achieved via the paper stop guide 120 prior to dumping the media sheets into the stacking bin. Further alignment along these edges may be easily accomplished, manually, after the sheets are removed from the bin. Other additions to the stacking assembly that facilitate alignment along the right and left edges may also be foreseeable. For example, an adjustable paper guide within the bin (acting as a "bookend") or a separate jogging system adapted to tap edges 5 and 6 into alignment may be implemented.

Some embodiments of the invention may be described as a media ejection system for a punch machine comprising a belt with a paddle extending out from the belt, the belt adapted to move the paddle to impact an edge of a stack of paper to move the paper in a direction parallel to the plane of said stack of paper. A receiving tray may be provided at an end of the belt, wherein the paddle pushes said stack of paper toward the receiving tray with the paper in a vertical position. The receiving tray may further comprise a rotating member with a longitudinal slot parallel to the plane of the stack, the slot receives the stack from the belt, and the rotating member is adapted to rotate on its axis to flip the stack 90-135 degrees to a generally horizontal position in the receiving tray.

Some embodiments may be described as a paper handling system for a punch machine, the handling system comprising an ejection assembly and a receiving assembly, the ejection assembly being adapted to hold a stack of paper generally vertically for punching in the punch machine, and comprising an ejection member that pushes the stack out of the punch machine horizontally. The ejection member may be endless belt having at least one paddle that moves against a vertical edge of the stack to push the stack out of the punch machine. The receiving assembly may comprise a rotating member and a tray, the rotating member having a slot parallel to the direction of travel of the stack being ejected from the punch machine, wherein the slot receives the stack and the rotating member is adapted to rotate to drop the stack in the tray. The preferred rotating member further has at least one push bar adapted to push against a punched edge of the stack after the stack has been dropped in the tray. The push bar may extends from the rotating member generally opposite the slot, so that, when the rotating member rotates upward to receive a subsequent stack, the push bar abuts against and pushes a previously dropped stack. A paper stop may be included for halting the horizontal movement of the stack during ejection from the punch machine, the paper stop preferably comprising a rotating disk with a stop member protruding axially from the disk and being perpendicular to the plane of the paper as it is ejected.

Alternative Embodiments Including Automatic Paper Feeder and Rearward-Facing Reception Tray Referring specifically to FIGS. 13-22, an alternative embodiment comprises an automatic paper feeder for a paper hole punch machine in addition to an ejection assembly and a reception assembly. The automatic paper feeder repeatedly provides a selected stack of paper sheets to the hole punch die assembly. The preferred paper feeder may be easily retrofit onto a conventional paper punch which receives paper vertically, as discussed above. After punching of the stack, the paper feeder preferably automatically ejects each punched stack into the reception tray from which the paper may be later removed without interrupting the feeding and punching operation. Preferably, the paper being fed to the punch is stored generally vertically, is fed to the die assembly generally vertically, and is ejected from the punch machine generally vertically.

The preferred paper feeder comprises a picking mechanism that accurately separates a stack of paper from a larger pile of paper in a stocking area, and a mechanism for moving the stack of paper into the die assembly for punching. The preferred paper feeder also includes an ejection mechanism for removing the punched paper from the machine for further processing. The preferred picking mechanism comprises a picking mechanism that includes intake rollers closely adjacent to, and moving with, a stabbing member, resulting in an accurate, economical, and predictable picking system. The preferred stabbing member is closely adjacent to paper stops that help control the location of the paper being advanced for picking, an arrangement that contributes to accuracy and predictability.

The reception tray of this embodiment, as discussed above for the embodiment with a forward-facing tray, receives the punched paper upon its exit from the hole punch machine, so that paper removal may be done only occasionally as needed or when the reception tray becomes full. This way, a large pile of paper may be stocked onto the feeder, and punched paper may later be removed for binding or other processing at a convenient time and in a convenient amount.

An object for the preferred paper feeder is to separate "stacks" of one or more sheets of paper or other material from a large pile of paper and sequentially insert them into the paper punch. The preferred feeder is designed to separate stacks of about 5-25 sheets, depending on the media and on adjustment made to the belt movement or paper stop mechanisms, and, typically, for conventional copy paper, a stack of 10-15 sheets of paper is optimum. A pile of about 2500 or more sheets of paper/media fits conveniently on the preferred feeder. Special features for efficient and accurate handling of the paper pile and of each stack of paper are preferably included in the paper feeder and reception tray, so that the stacks are handled in quick succession to match the speed of the paper punch, for example, in the range of about 18,000-30,000 sheets per hour. For the preferred paper punch, which may operate at about 35 punch cycles per minute, the automatic paper feeding and large pile of paper stock offered by the invented system increases speed and improves accuracy of paper punching.

Referring to FIGS. 13-22, there is shown the preferred, but not the only, embodiment of the paper feeder for a hole punch machine, which is well-adapted for a punch machine as shown in FIGS. 4 and 5. The paper feeder may be used in cooperation with other machines, for example, other hole punches or paper binding machines. Also, throughout this Description, the term "paper" is used, but the invention is not limited to handling paper, but rather may be used for handling of various sheet materials that are to be punched, for example, plastic sheets.

The preferred embodiment of the paper feeder 210 is shown in the Figures attached to the top of the punch machine (P). Preferably, the feeder 210 is pivotally and removably attached to the punch at hinge 212 near the rear of the punch and is latched near the front at latch 214. This way, the feeder 210 may be pivoted up away from the punch for servicing of either punch or feeder.

Figure 15:
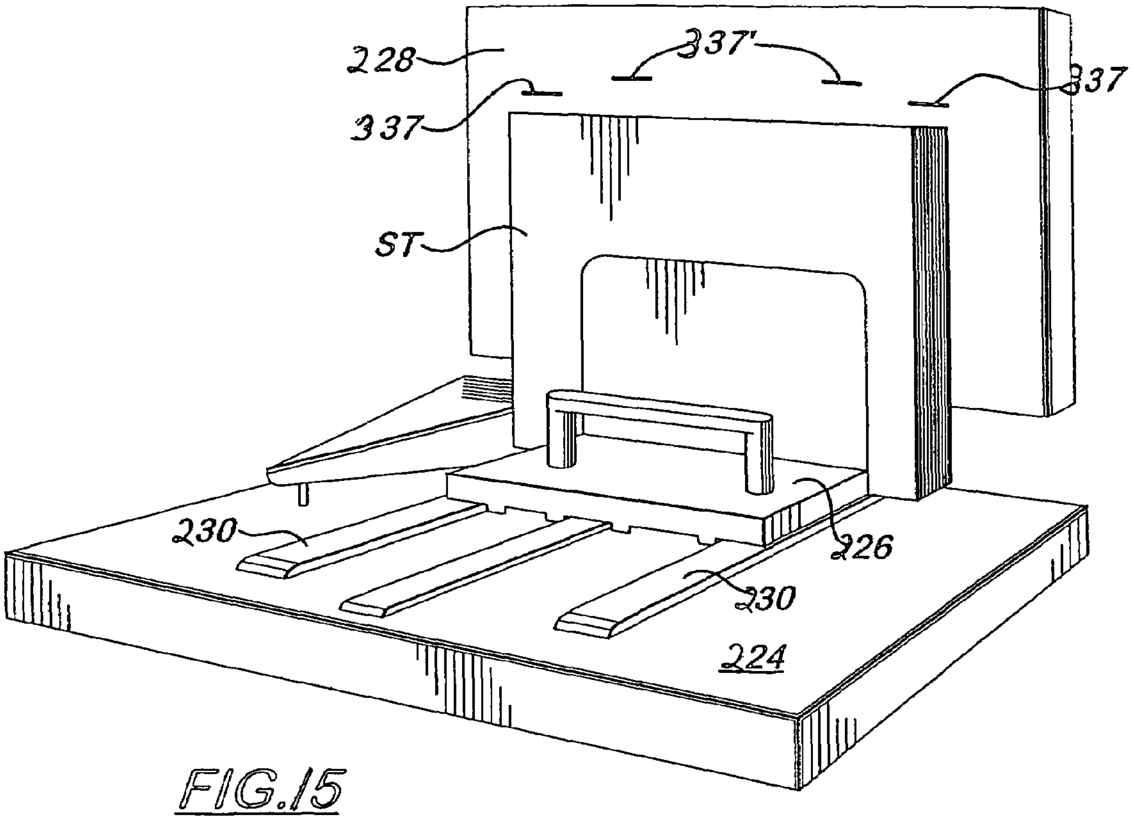
FIG. 15 is a left-front detail perspective view of the paper stocking area of the embodiment of FIGS. 13-14, wherein a small, generally vertical pile of paper rests on the paper feeder, fully advanced by the advancement belts and supported in the vertical position by a weight.

The feeder 210 has a generally L-shaped housing with a front side 216, left side 218, rear side 220, right side 222, and top surface 224. The paper pile or stock is placed on the top 224 with the sheets running generally vertically, as shown in FIG. 15. The top surface 224 is slightly slanted at about 10-12 degrees downward toward the front, so that the paper pile tends to lean forward toward the "inner surface" 228. A weight 226 is placed on the top surface to aid in keeping the paper pile in place and moving toward the front. Two belts 230 incrementally move the pile forward after each stack of paper is picked from the pile, moved downward to be punched and then removed from the feeder 210. Along the top surface 224 may be strips or other areas of an abrasive or rough material which gently contacts the edges of paper as it is moved across the areas and which serves to fluff the paper, that is, slightly separate and "un-stick" the individual sheets from each other. This improves both the picking process and the stack lowering process (described below) and results in greater accuracy and consistency. The preferred rough areas are strips of hook and loop fastener, preferably the more "bristled" side of the fastener which is the hook side. Two strips of hook fastener may be attached to the top surface parallel to the belts 230, with the strips reaching slightly above the plane of the top surface for contacting the bottom edges of the paper.

Figure 16A:
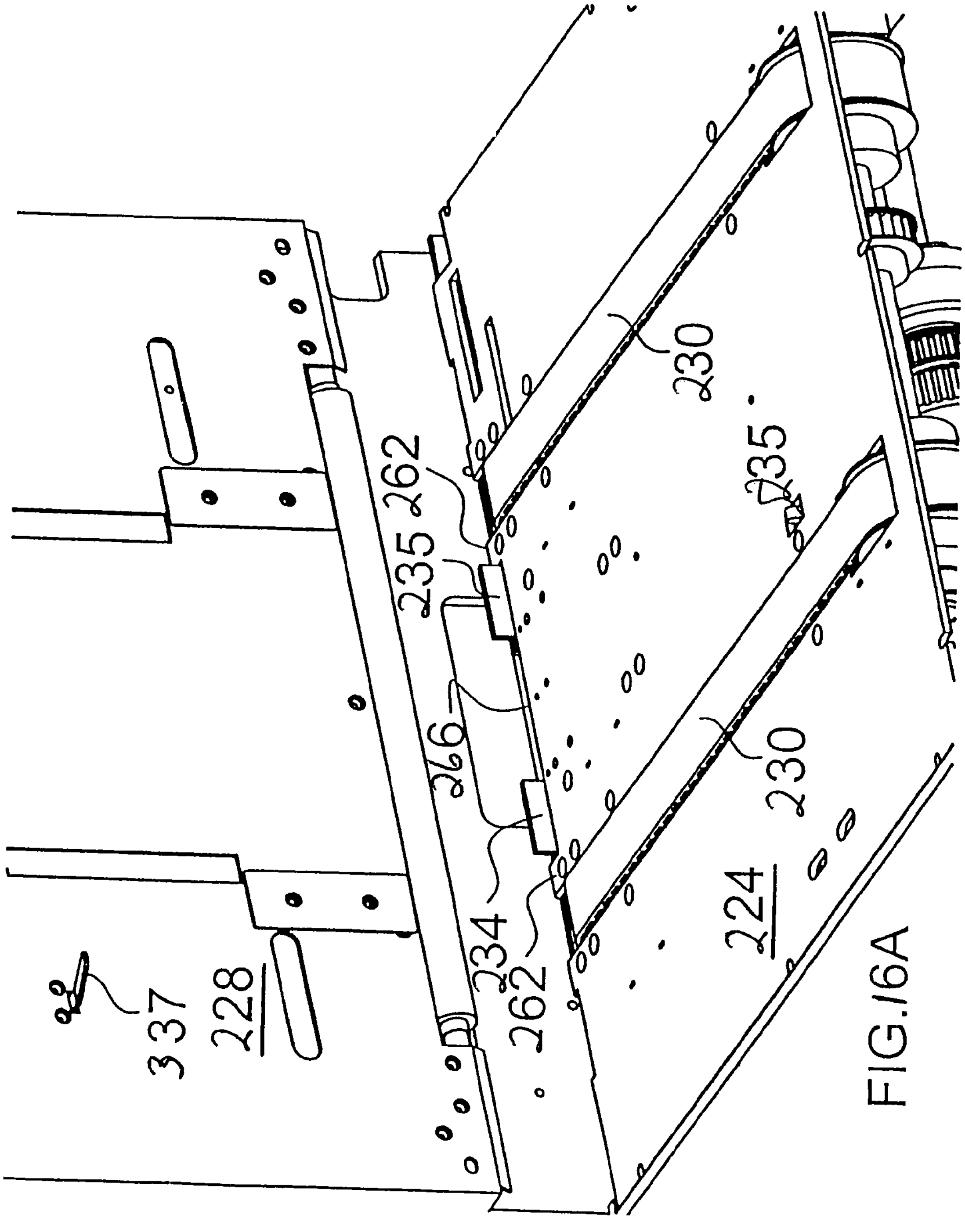
FIG. 16A is a right, perspective detail view of the stocking area of the embodiment of FIGS. 13-15, without paper or a weight, illustrating the paper stops in the up-position.
Figure 16B:
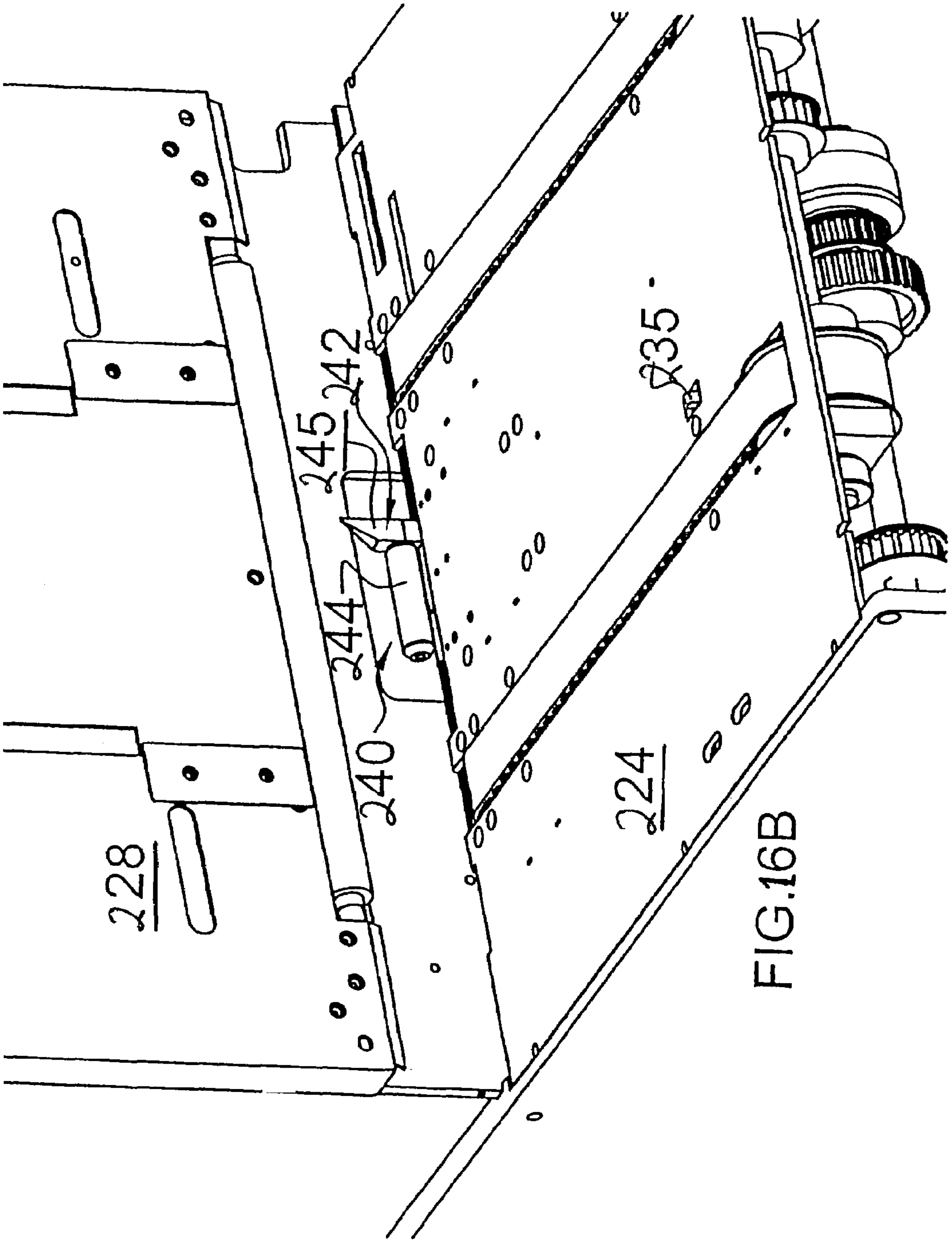
Figure 17:
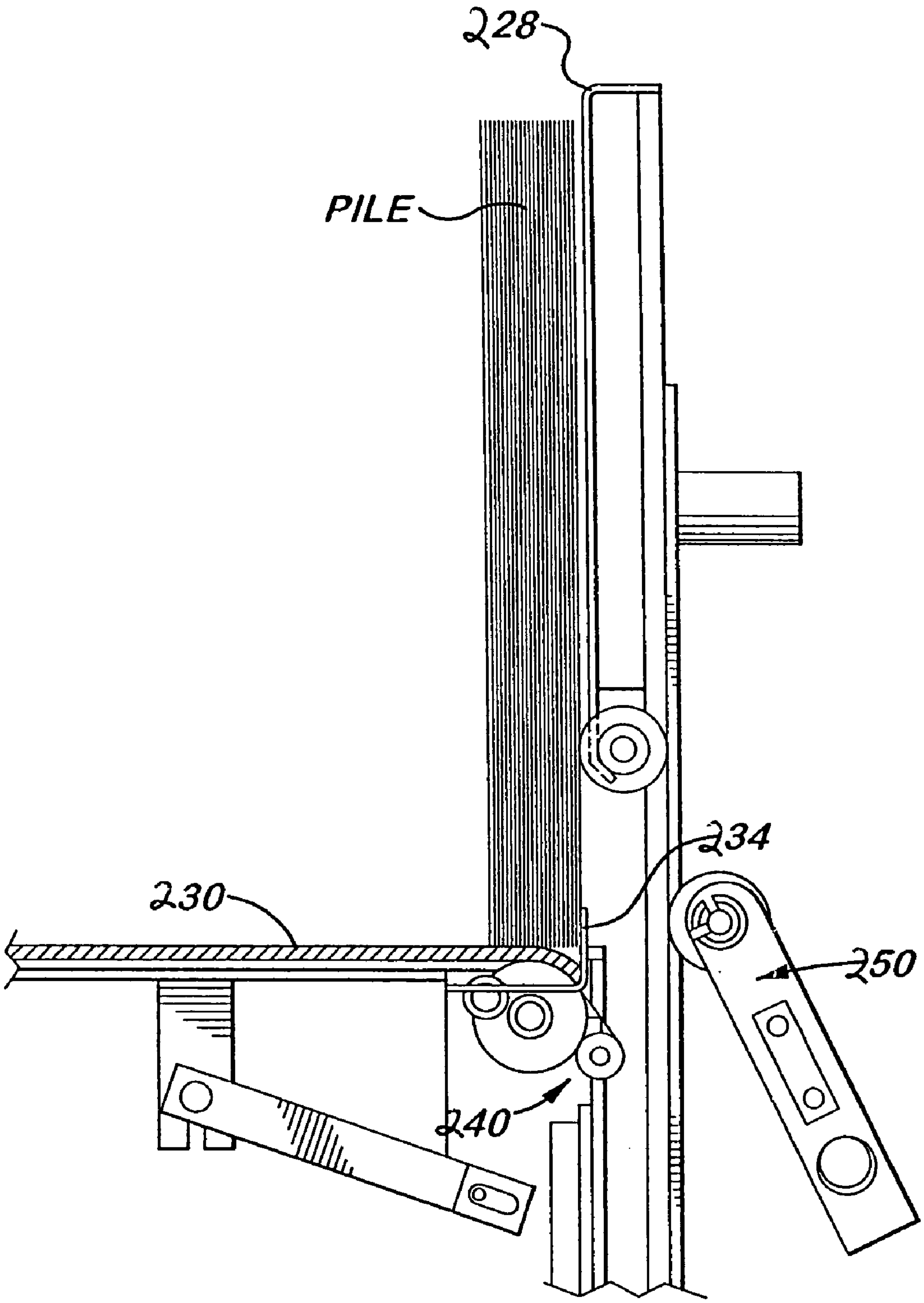
FIG. 17 is a left detail view of the stocking and picking system of the embodiment of FIGS. 13-16, shown with the paper pile generally in the position as in FIG. 5, fully advanced against the raised paper stops, and with the feeder roller swung away from the paper.

The belts 230 move the paper pile toward the inner surface, where the inner-most sheet abuts against paper stop(s) 234, as shown in FIGS. 16A, 16B, and 17. The stops 234 are in the raised position when the picking assembly 240 is in the retracted (down) position, as shown to best advantage in FIGS. 16A and 17. Picking assembly 240, includes stabber 242 and idler wheel(s) 244, which is preferably one wheel 244 rotatably attached to the stabber on either side of the stabber 242, but preferably on the left side of the stabber as in FIG. 16A.

Figure 18:
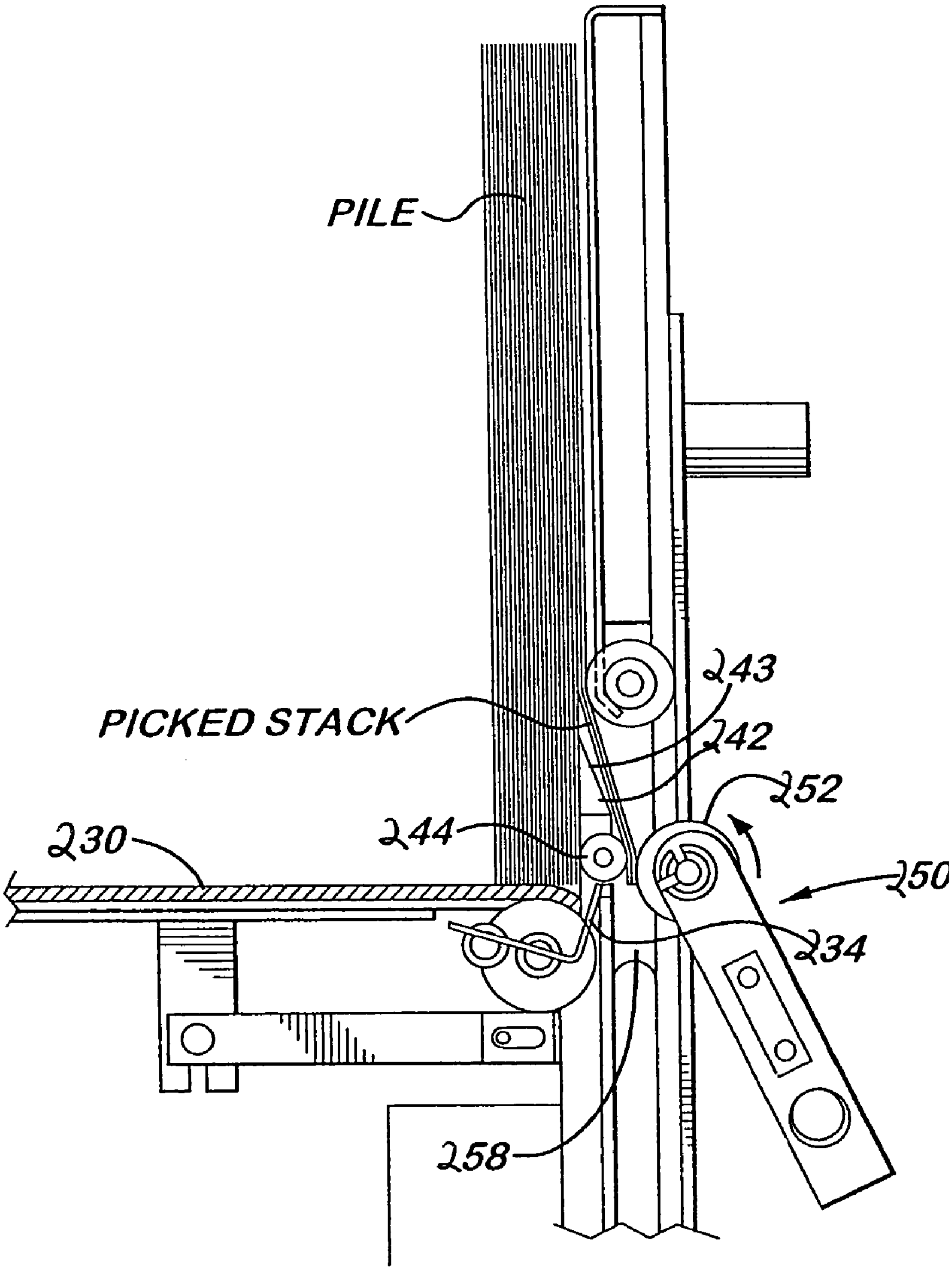
FIG. 18 is a left detail view of the stocking and picking system of FIG. 17, wherein the paper stops have been lowered and picking mechanism raised to pick a stack of paper, and wherein the feeder roller is swung in against the picked stack of paper to lower it into the die assembly.
Figure 19:
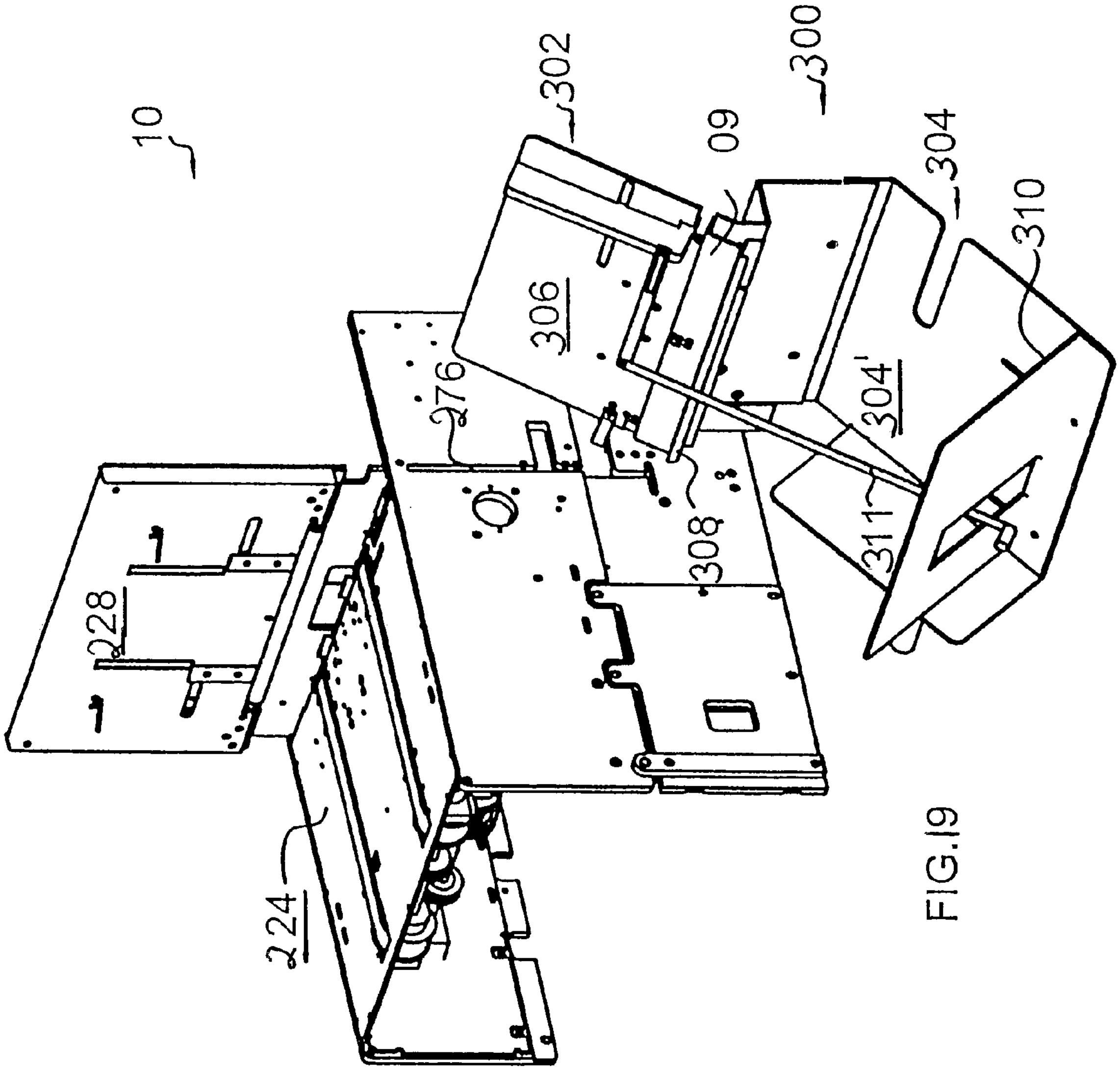
FIG. 19 is a left-rear perspective view of another embodiment of the paper feeder system, shown with the rear panel of the paper feeder removed to partially show the under side of the paper advancement system, and shown with a reception tray installed near the paper feeder and facing rearward.
Figure 20:
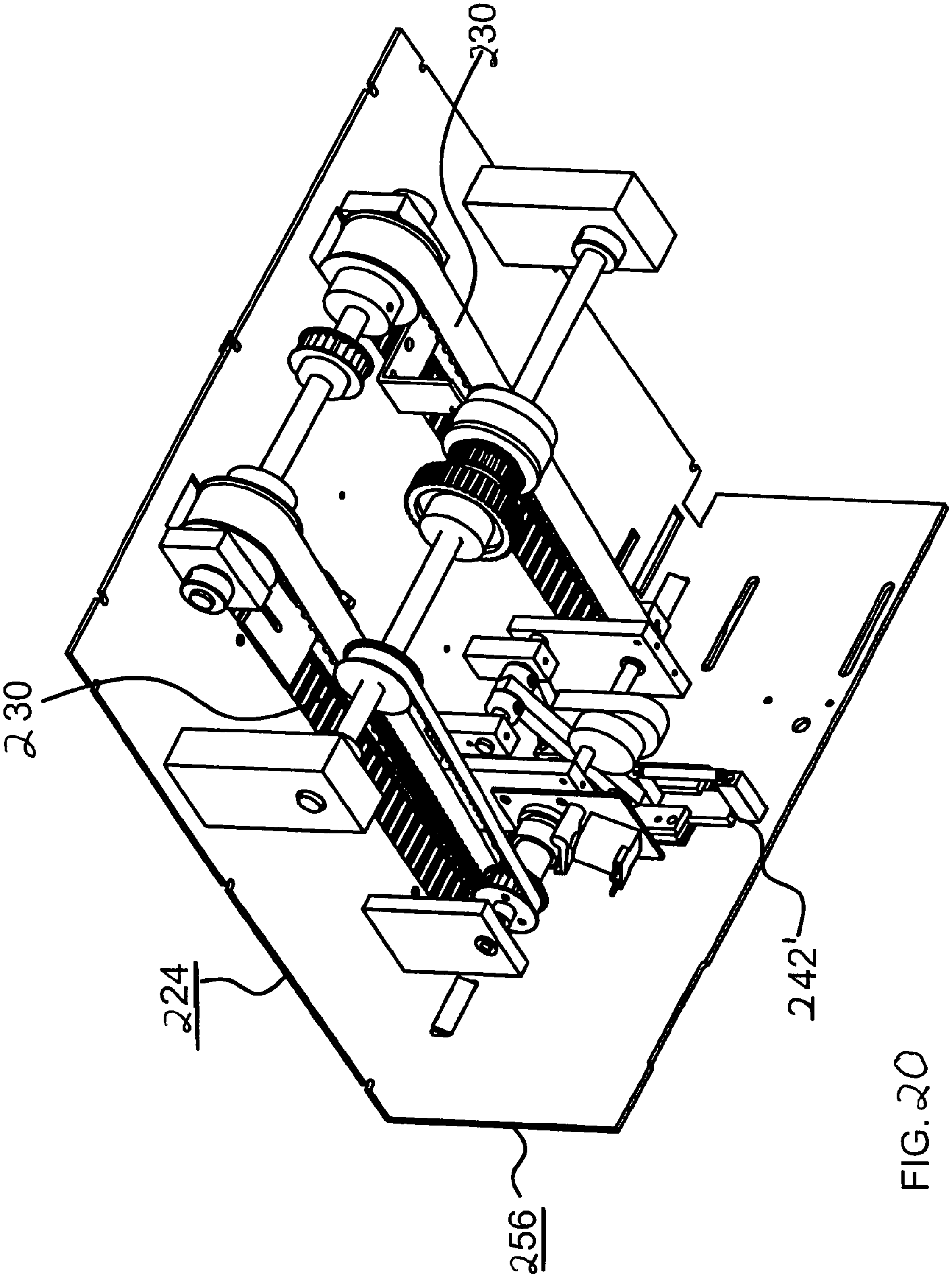
FIG. 20 is a bottom, left-rear perspective view of one embodiment of the paper advancement system of the embodiments of FIGS. 13-19.

After the belts 230 incrementally move the pile forward to place the front sheet against the stops 234, the picking assembly 240 moves upward toward the bottom edges of the paper pile at a preset (adjustable) distance into the pile. The stabber 242, with its pointed and slanted front top surface 243 and its generally vertical rear surface 245, slides between two paper sheets to separate the desired stack of paper from the bulk of the pile, as shown in FIGS. 17 and 18. The slanted front top surface 243 acts to urge the bottom edges of the picked sheets forward for subsequent contact by the feed roller mechanism, described below.

Thus, one may see that the amount of picking is determined by the relative placement of the stops 234 and the stabber 242, because the pile is moved forward as far as the stops will permit and then the stabber raises up and separates a picked stack of paper at a set position, which results in the distance between the rear surface of the stops and the rear surface being approximately the thickness of the picked stack. Preferably, the stabber is closely adjacent to one of the stops, without rollers of other structure laterally between the stabber and said one stop. This closeness of the stabber and the stop provides a more accurate picking action, which is believed to be because there is likely to be little or no buckling of the paper between the stop and the area in which the stabber raises. This way, the stabber stabs up into firmly-positioned and straight sheets of papers is likely to pick precisely the amount of papers desired.

The stops 234 are timed with the picking assembly 240, so that the stops retract downward, as the picking assembly 240 moves upward, as best illustrated in FIGS. 17 and 18. After the picking assembly 240 is in the raised position, the paper feed roller mechanism 250 pivots inward (counter-clock-wise in FIGS. 17 and 18) so that the feed roller 252 contacts the front sheet of the stack. This way, the lower part of the stack is pressed between the feed roller 252 and the idler wheel 244, so that the feed roller rotation drives the stack downward relative to the "un-picked" paper pile generally along surface 256 (see FIG. 20) into space 258 and into the slot S of the die assembly.

To determine the size of stack that is to be picked, various adjustments are possible, for example, preferably the location of the paper stops 234. In one embodiment, which assumes that adjustment of the size of stack only occasionally will be adjusted, the paper stops 234 are adjusted by accessing the interior of the feeder. Alternatively, for special applications which make more frequent adjustment desirable, easily-accessible adjustors may be designed, or adaptors that fit onto or over the stops 234. Such adaptors (not shown) may be sleeves that fit over the stops to increase the size of the stops, that is, to bring the rear surface of the stops farther toward the rear of the feeder. With such a system, the stops may be located at a relatively forward position, and variously-sized sleeves may be attached to the stops as needed, in effect, to move the rear surface of the stop toward the belts. Less preferably, other systems may be used to affecting the stack size, for example, adjusting the location of the picking mechanism when it extends upward into the stack.

The indexing of the belt movement also affects picking performance and consistency, and controls and sensors may be used to optimize the belt movement during each index step. Preferably, the belt movement is pre-programmed to incrementally move the pile forward, to push the front of the pile against the stops, at a set speed, after the previous step of picking of a stack of paper. Preferably, the belt speed does not change over the wide range of paper pile size, but the amount of time the belt is moving for an incremental forward movement of paper does change. A mechanical friction clutch is preferable, and the time the clutch continues movement of the belt is determined by signals from a programmable logic controller in the feeder 10. The belt may tend to slip underneath the pile somewhat, depending on the weight of the pile, and also a) when the pile is large (heavy), there is more slippage in the clutch system, and b) when the pile is small (light), there is less slippage in the clutch system. To adjust the amount of time the belt(s) move forward for each incremental advancement of paper, one or more switches 235 located on the top surface 224 may be used. Switch 235 is preferably a micro-switch and is activated when the paper pile is large and the weight covers/contacts the switch. When the switch is activated, the programmable logic controller signals the clutch to allow belt movement for a specific, relatively long, amount of time during each incremental advancement. When the pile no longer rests in that particular area of the top surface 224 (actually when the weight moves with the pile forward and clears the switch 235), the switch is released, and the programmable logic controller provides a shorter output to the mechanical friction clutch, which keeps the clutch on for a shorter time of belt movement at the same belt speed. If more than one switch is used along the distance between the rear and the front of the top surface 224, several incremental adjustments of belt movement time are made as the paper pile/weight moves forward. Other systems may be developed for belt movement control, but this has been found to be particularly effective.

Additional equipment may be used to produce accurate picking and paper handling. For example, tabs 262 extend generally parallel to top surface 224. Tabs 262 prevent the paper stack from falling down into the space just in front of edge 266. Tabs 262 may be slightly raised relative to the surrounding top surface 224 and/or have a roughened surface at that position, for providing enough friction against the bottom edges of the paper sheets to prevent bowing in response to the belts pushing the paper forward. Preventing this bowing or bulging of the sheets, for example, their centers relative to their outer regions, helps keep the sheets straight especially in the region of the picking mechanism, for accurate and smooth picking. Additionally, a top-edge stops 237, or adjustable top-edge stops 237', may be included to guide/stop the top edges of the pile/stack, especially if the picking assembly nudges any of the paper upward. Additionally, it is envisioned that a system for reducing static electricity on the paper sheets may be added (not shown), such as a blast of ionized air directed at the sheets to reduce the static. This static-reduction would especially be useful in the handling of plastic sheets, which are prone to static buildup.

After each stack of paper rests fully inserted down into the slot of the die assembly, joggers are used to align the paper stack properly in the die assembly. Preferably, a lateral jogger included in the feeder moves out and then inward to tap one or more times against the end of the paper set in the die assembly. Also, preferably, one or more top joggers move out to tap down on the top edge of the paper stack. After this alignment of the paper stack, which replaces the manual tapping and alignment of each hand-inserted stack that a user would have to do, the hole punch machine is actuated and holes are punched in the paper. Prior to the punched paper stack being removed from the punch machine-feeder combined unit, the joggers retract out of the way of the paper.

Paper removal is actuated by a timed device that slides the paper stack sideways (longitudinally, horizontally) out the end of the die assembly. The preferred removal mechanism is belt, such as the type shown in FIGS. 8A and 8B, located in front of and above the slot in the die assembly. The belt is a paddle belt which comprises the belt portion and two paddles at opposite ends of the belt. During insertion of the paper stack into the die assembly, the belt is in the position shown in FIGS. 8A and 8B. When the paper stack is to be removed from the die assembly, the belt moves to place one paddle against the end edge of the paper (near the right side of the machine) and the paddle then pushes the paper sideways out of the die assembly. When the belt has traveled ½ revolution, the paddle that has pushed the paper has moved to the left side of the machine and paper has slid out of the paper exit 276 in the left side. The paddles may be variously shaped, but preferably have a flat surface 278 for contacting the paper end edges. The paddles may have optional rounded/angled corners, which are not involved in the process of contacting paper, but are merely to clear other structure inside the preferred feeder as the belt moves.

The paper reception tray 300 is preferably connected to, or placed next to, the feeder 210 near the paper exit 276. The punched stacks of paper slide sideways into the upper or top tray 302, which comprises a generally upright but slightly slanted surface 306, lip 308, and pusher bar 309. The pusher bar may be timed as desired to push the bottom of the stack rearward (toward bottom tray 304) to drop the stack or stacks accumulated generally vertically onto the top tray 302 into their resting generally horizontal position in the bottom tray 304. Other pushing/dropping mechanisms may be designed to move the accumulated stack(s) from the generally vertical tray into the generally horizontal tray. The punched stacks accumulate in the bottom tray 304 for easy removal by a user, without the need to stop the punch machine or the feeder. While the orientation of the surface 304' of bottom tray 304 is said to be generally horizontal, there may be some rearward slanting to it to encourage paper to move fully to abut against the rear wall 310 in a neat orderly stack. To further encourage orderly and neat stacking of punched paper in bottom tray 304, a flexible guide strap 311 may extend from the top tray 302 (from a position out, rearward from the paper resting in top tray 302) and slanting downward to near the rear of the bottom tray. This strap 311 serves to guide paper as it is pushed into the bottom tray, to prevent curling or flying or mis-aligned paper.

Various features may be added to the tray 300, for example, a vibrator for aligning the paper in the bottom tray in position against one corner (assuming the floor of the bottom tray is slightly slanted toward that corner). Or, a paper deflector may be installed near the inside surface 310 of the bottom tray (not shown) to hold the accumulated paper out from the surface 310 slightly for easier access and removal. Slot 312 allows the user to grasp paper with shutting down any of the systems. Other stationary guides or movable guides, such as guides 314, 315, 316, may be added for paper alignment and control, for example, for various sizes or various compositions of media.

Adjustable or selectable stops or joggers may be used to adapt the feeder for handling of media with variously-shaped edges. For example, as one may note in the Figures, adjustable top edge stops 337' are included on the upper portion of the feeder. Also, four tog joggers are preferably supplied inside the upper portion of the feeder for alignment of the paper stack in the die assembly. These mechanisms are provided to adapt the feeder for handling of either tabbed media, wherein the paper/media has a non-straight edge formed by a tab or index, or for handling of straight-edges paper/media. The two adjustable top edge stops 337' are used for straight-edged media, and the two outer stops 337 are used for the tabbed media. Likewise, two inner top joggers are used for straight-edged media, and the two outer joggers are used for tabbed media.

Figure 21:
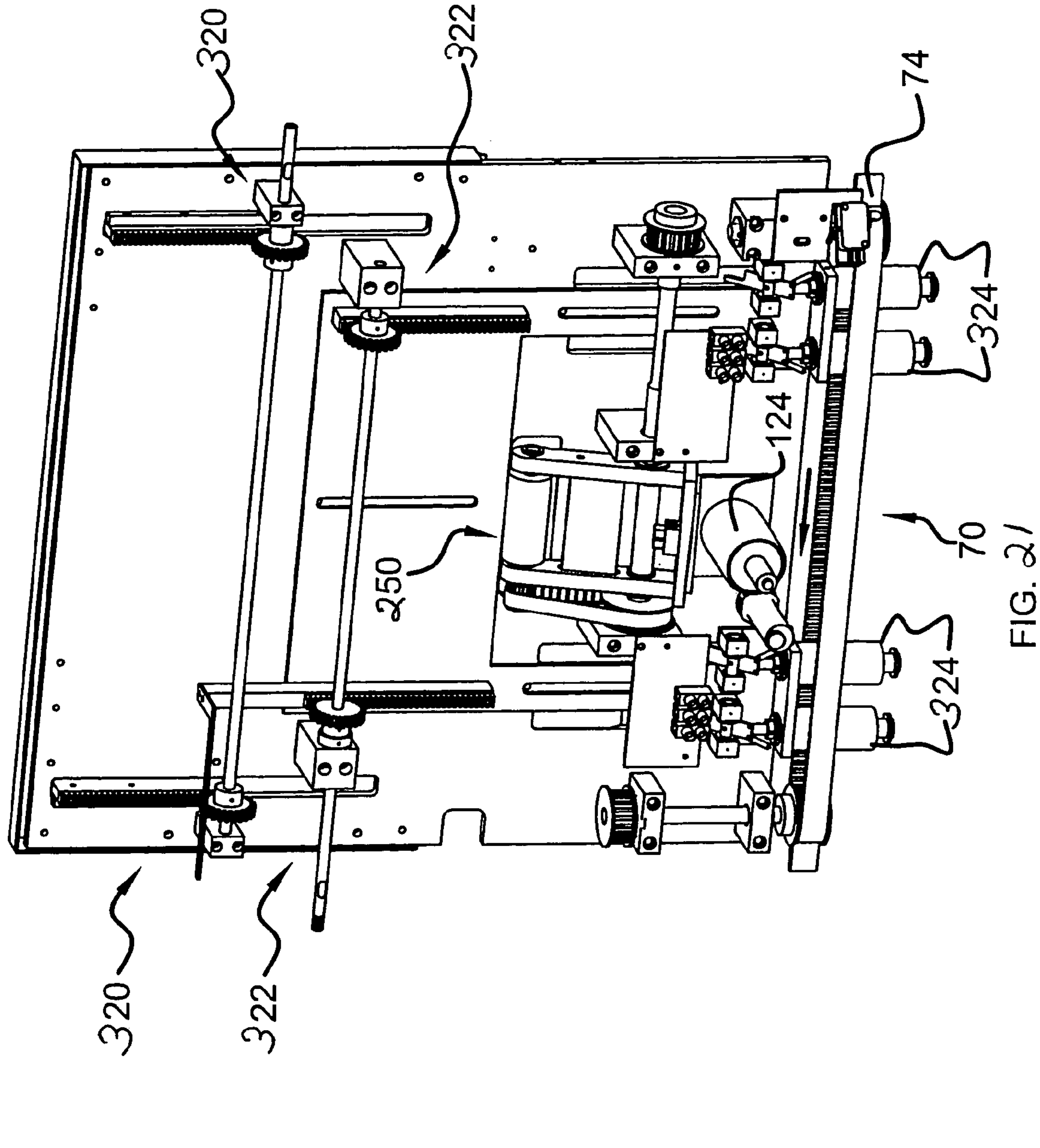
FIG. 21 is a bottom, front perspective view of one embodiment of the paper feeder roller, paper jogger, and paper ejection systems of the embodiments of FIGS. 13-19.
Figure 22:
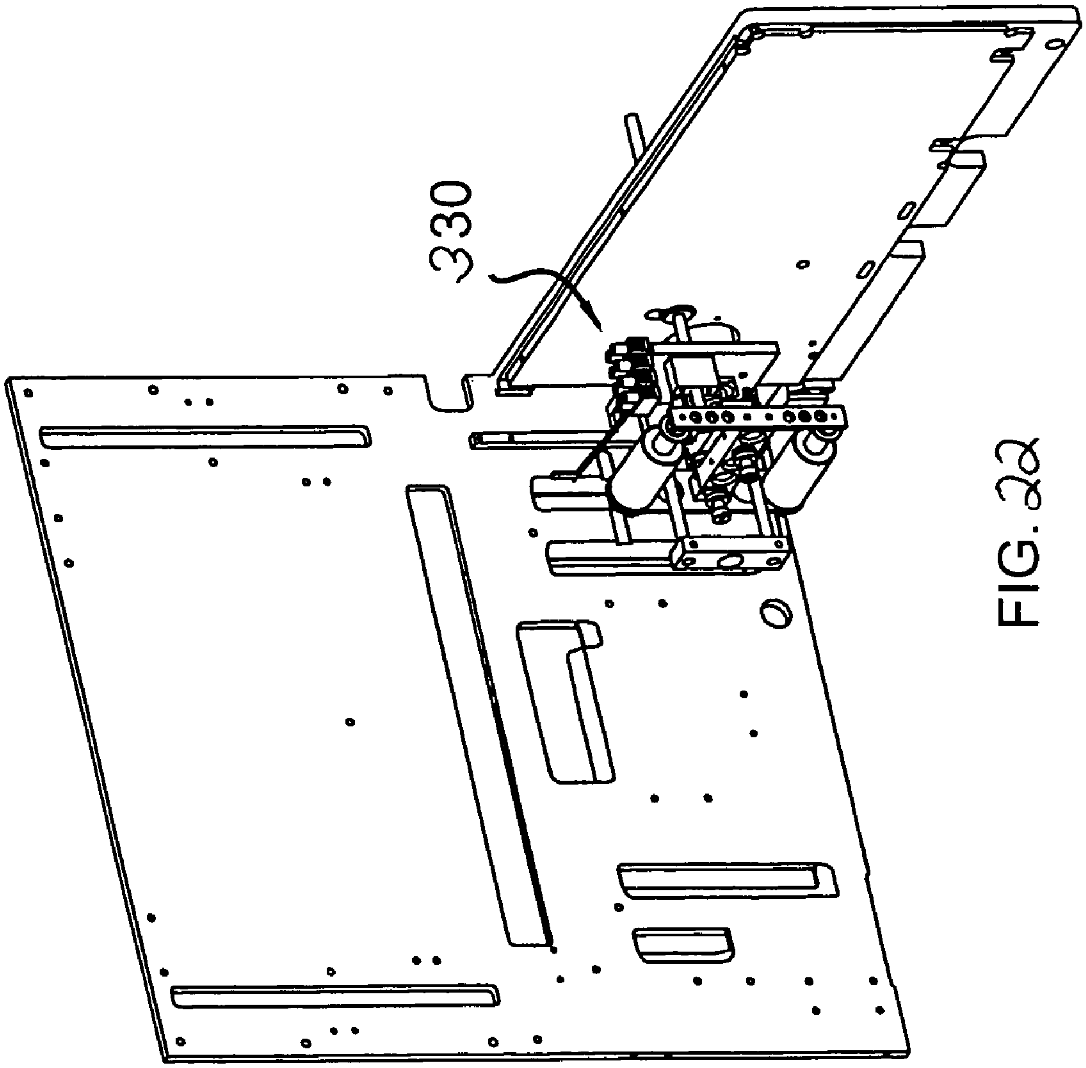
FIG. 22 is a rear, perspective view of one embodiment of a side-jogger system installed in front and left side panels of the paper feeder of the embodiments of FIGS. 13-19.

As illustrated in FIG. 21, the internals of the top portion of the feeder may include mechanisms 320 for adjusting top edge stops 337', rack and pinion adjustment 322 for up and down adjustment of top joggers to tap paper downward, along with various solenoids 324 for operation. In FIG. 22, is shown the details of a side jogger 330.

Once the features of the invented feeder for handling sheets of media is understood as described above and as drawn herein, it may be within the skill of one in the art to design the control/electronics systems for proper timing of the various mechanisms described.

An important feature of the paper feeder and reception tray system is that they are remarkably insensitive to changes in paper/media condition and ambient conditions. For example, the various features of the invention substantially prevents jamming and other problems due to humidity or static electricity affecting the media being handled.

Summarizing the preferred steps performed with the paper feeder and punch, which preferably involves vertical feeding, punching and ejecting of the paper. In a first step, the feeder incrementally moves a pile of media, preferably with the sheets positioned vertically, toward a picking assembly. In a second step, the picking assembly separates a plurality of sheets of the media from the large pile. In a third step, the feeder moves the "picked" stack away from the remainder of the pile, preferably down generally parallel to the plane of the sheets in the pile. This third step moves the stack into a station for processing, such as a die assembly in a hole punch. In a fourth step, joggers preferably automatically align the sheets of the stack in the station to correct any misalignment that may have occurred during the earlier steps. The fifth step is the processing step, preferably hole punching, performed by the station. Once this processing is complete, the feeder performs the sixth step which moves the media away from the station, preferably moving the stack parallel to the plane of the sheets but laterally in a direction perpendicular to the direction of movement in the third step above. Upon exiting the station, the stack preferably moves into a holding position in a reception tray that places the stack substantially in the same orientation as when it exits the station, preferably substantially vertical. After one or more stacks accumulate in this holding position, the reception tray ejects the stack(s) into a final resting position separate from the holding position, which is preferably a horizontal portion of the reception tray, for easy access by a user without any interference with the feeder or the exiting stack(s).

An important feature of the invented paper feeder and reception tray system is that it may be used continuously, while paper is added to the pile on top of the feeder, and paper is removed from the reception. The user need not stop the machine to add paper, because the vertically-positioned pile of paper, the picking from the front of the pile, and the vertical movement of the picked sheet or sheets of paper, or other media, are not interfered with by adding to the back of the pile. Also, removing paper from the end of the process (the reception tray) does not interfere with the feeding or punching processes, because the exiting paper moves to an intermediate storage position in the top tray, which remains closely adjacent to and at the same level as the paper exit opening of the punch machine, before being ejected into the horizontal position. Thus, during the addition/removal processes, the user's hands do not interfere with, or become endangered by, the equipment or the paper or other sheets being handled. Because most other paper handling systems pick paper from the top of a horizontal stack, a user must stop such a system to add paper to the top of the stack. Also, most systems pile the exiting paper directly on top of an exit stack without any intermediate storage, and require shut-down of the machine for accessing the finished paper.

Thus, embodiments of an automatic paper ejecting and stacking machine for use with vertically-loaded desktop hole-punching equipment are disclosed, and also embodiments that include a paper feeding system. The ejector and stacker may work together to remove vertically-fed paper stacks from a hole punch and align said stacks in a horizontal stacking bin adjacent the punch machine and preferably facing the operator, but optionally facing away from the operator. The ejection assembly may be provided atop a vertically-fed hole punch to receive media stacks of preferably 20-30 sheets. After the sheets are punched, a sheet transfer mechanism moves the vertically-oriented (standing on edge) media stack horizontally from the punch machine/ejection assembly to the reception assembly. The sheet transfer mechanism may comprise a plurality of transfer paddles arranged on an drive belt wherein a motor rotates the belt to draw a paddle (adapted to abut against the trailing edge of the media stack) through the paper-receiving channel of the ejection assembly to push the media stack out of the channel.

In one version, the media stack is directed, after being pushed out of the channel, into the reception assembly along a sheet transfer path parallel to the length of the media sheets, wherein the stack is first forced into a paper-accepting groove situated atop a rotating shaft. As the paper is moved longitudinally into the reception assembly, a rear panel of the assembly prevents the paper from falling backwards and away from the stacking bin. A paper stop guide halts the longitudinal transfer of the sheets when the sheets are directly above the stacking bin. The shaft is then rotated toward the machine operator (who stands in front of the punch machine) to dump the media stack into the bin. An alignment mechanism that is preferably integral with and co-actuated with the shaft, then align the edges of the media sheets within the stacking bin.

In another version, the media is directed, after being pushed out of the channel, into a rearward-facing tray with a pusher bar that pushes the bottom edges of the media out and rearward toward the outer edge of the tray.

The preferred, forward-facing reception assembly (FIGS. 3, 6, 9-12) flips the paper stack forward at its top edge, so that any print facing forward during punching will, in the stack in the tray, be face-down, wherein "forward" is defined relative to the front of the punch machine wherein the operator would normally stand. The punched edge in this embodiment (FIGS. 3, 6, 9-12) then lies at the rear of the tray, which may be considered the inner edge of the tray. In the alternative embodiment in FIGS. 13-22, which pushes the bottom rearward, any printing facing forward during punching will also be facing down in the alternative tray. In this alternative embodiment, the punched edge also then lies at the rear of the tray, which may be considered the outer edge of the tray.

Although this invention has been described above with reference to particular means, materials, and embodiments, it is to be understood that the invention is not limited to these disclosed particulars, but extends instead to all equivalents within the following claims.

I claim:

1. A paper handling system comprising an ejection assembly, a receiving assembly, and a plurality of paper sheets to be transferred by the ejection assembly to the receiving assembly, wherein:

the ejection assembly comprises a vertical slot with a depth and a length;

said plurality of paper sheets is received vertically in said vertical slot and each of the paper sheets having a bottom edge inside said vertical slot;

said ejection assembly comprises an ejection member that pushes said plurality of paper sheets horizontally out of the vertical slot in a direction parallel to the length of the vertical slot and into the receiving assembly;

wherein the receiving assembly comprises:

a horizontal, rotatable shaft with a length and a longitudinal groove; and a stacking bin located below and in front of the shaft and having a bin floor surface and a front wall; and wherein said horizontal, rotatable shaft is motor-driven to rotate on a horizontal axis between a paper-receiving position and a paper-dropping position, wherein, when the shaft is in the paper-receiving position, the groove is upward and receives the bottom edges of the plurality of paper sheets when the ejection member pushes said paper sheets out of the vertical slot, and wherein, when the shaft is motor-driven into the paper-dropping position, the groove is rotated 90-135 degrees forward toward the stacking bin to drop said plurality of paper sheets forward into said bin; and wherein the paper handling system further comprises:

a lift bar provided in the stacking bin, on which lift bar the plurality of papers fall when dropped from the shaft to said bin, said lift bar raising said bottom edges of the paper sheets above the bin floor surface; and said horizontal, rotatable shaft further comprising at least one push bar extending from said shaft opposite the groove, wherein, when the shaft is motor-driven to return to the paper receiving position after dropping said plurality of papers into the bin, said at least one push bar rotates with the shaft so that a front surface of said at least one push bar hits said bottom edges of the plurality of paper sheets that are raised by said lift bar, to align said bottom edges and push said plurality of paper sheets forward against the front wall of the stacking bin.

2. A paper handling system as in claim 1, wherein the ejection member comprises a belt with a paddle extending out from the belt, the belt moving the paddle to impact said plurality of paper sheets to move the plurality of paper sheets horizontally out of the vertical slot into the receiving assembly.

3. A paper handling system as in claim 2, wherein belt is generally a circular belt and the belt has two paddles 180 degrees apart on the belt.

4. A paper handling system as in claim 1, wherein the receiving assembly further comprises a rear housing panel, a disk moveably mounted to the rear housing panel at an end of said shaft opposite the ejection assembly, wherein the disk has a circular surface and a perimeter edge and an arm extending from the circular surface near the perimeter edge in a direction perpendicular to the length of the shaft, wherein the disk is rotatable to position the arm at various distances from said ejection assembly to stop said plurality of paper sheets from moving past said arm when the ejection member pushes said plurality of paper sheets horizontally out of the vertical slot into the receiving assembly.

* * * * *